US012737823B2

(12) United States Patent
Riemer et al.

(10) Patent No.: US 12,737,823 B2
(45) Date of Patent: Sep. 15, 2026

(54) FINANCIAL DATA ANALYTICS ENGINE ASSOCIATED WITH A CUSTOMER RELATIONSHIP MANAGEMENT SYSTEM

(71) Applicant: The Boston Consulting Group, Inc., Boston, MA (US)

(72) Inventors: Kirsten Stiene Riemer, Munich (DE); Markus Andreas Wiemann, Frankfurt (DE); Christian Claus Wagner-Binder, Ludwigshafen (DE); Jakob Maximilian David Liss, Germering (DE); Alexander Albert Wetzler, Frankfurt am Main (DE); Felix Andreas Gerken, Munich (DE); Christof Friedrich Naumzik, Hamburg (DE); Ian Stokes-Rees, Syracuse, NY (US); Barric Allen Reed, New York, NY (US)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 655 days.

(21) Appl. No.: 17/687,134

(22) Filed: Mar. 4, 2022

(65) Prior Publication Data

US 2023/0138753 A1 May 4, 2023

Related U.S. Application Data

(60) Provisional application No. 63/274,882, filed on Nov. 2, 2021.

(51) Int. Cl.
*G06Q 40/06* (2012.01)
*G06F 18/21* (2023.01)
(Continued)

(52) U.S. Cl.
CPC ............ *G06Q 40/12* (2013.12); *G06F 18/21* (2023.01); *G06Q 10/0635* (2013.01); *G06N 20/00* (2019.01)

(58) Field of Classification Search
CPC .... G06Q 40/12; G06Q 10/0635; G06Q 40/02; G06Q 40/06; G06F 18/21;
(Continued)

(56) References Cited

U.S. PATENT DOCUMENTS

| | | | | |
|---|---|---|---|---|
| 10,157,352 | B1 * | 12/2018 | Chan | G06N 5/047 |
| 11,373,232 | B2 * | 6/2022 | Sanghavi | G06N 5/04 |
| 2022/0405775 | A1 * | 12/2022 | Siebel | G06Q 30/0202 |

OTHER PUBLICATIONS

Lundberg et al., "A unified approach to interpreting model predictions," Advances in Neural Information Processing Systems, 2017, 30, 10 pages.

* cited by examiner

*Primary Examiner* — Peter Ludwig
*Assistant Examiner* — Reva R Moore
(74) *Attorney, Agent, or Firm* — Fish & Richardson P.C.

(57) ABSTRACT

Methods, systems, and computer storage media for providing financial data analytics recommendations using a data analytics engine in a customer relationship management system. The recommendations can be a lead that is information associated with a model-generated suggested consumer solution, an alert of increased risk of attrition, or an alert of increased risk of default. The data analytics engine is configured to generate target variables associated with financial products or the customer relationship and utilize modeling techniques and apply rules to generate recommendations. Operationally, the recommendations are generated based on a data analytics model. Generating the recommendations is based on feature variables that are generated based on aggregation and transformation of customer data and
(Continued)

utilizing machine learning models to detect patterns in the customer data using the feature variables. The recommendations can be presented via a financial data analytics interface along with insights that provide plain text explanations of the recommendations.

14 Claims, 18 Drawing Sheets

(51) Int. Cl.
*G06N 20/20* (2019.01)
*G06Q 10/0635* (2023.01)
*G06Q 40/12* (2023.01)
*G06N 20/00* (2019.01)

(58) Field of Classification Search
CPC .. G06F 18/24323; G06N 20/00; G06N 5/045; G06N 5/01; G06N 20/20
See application file for complete search history.

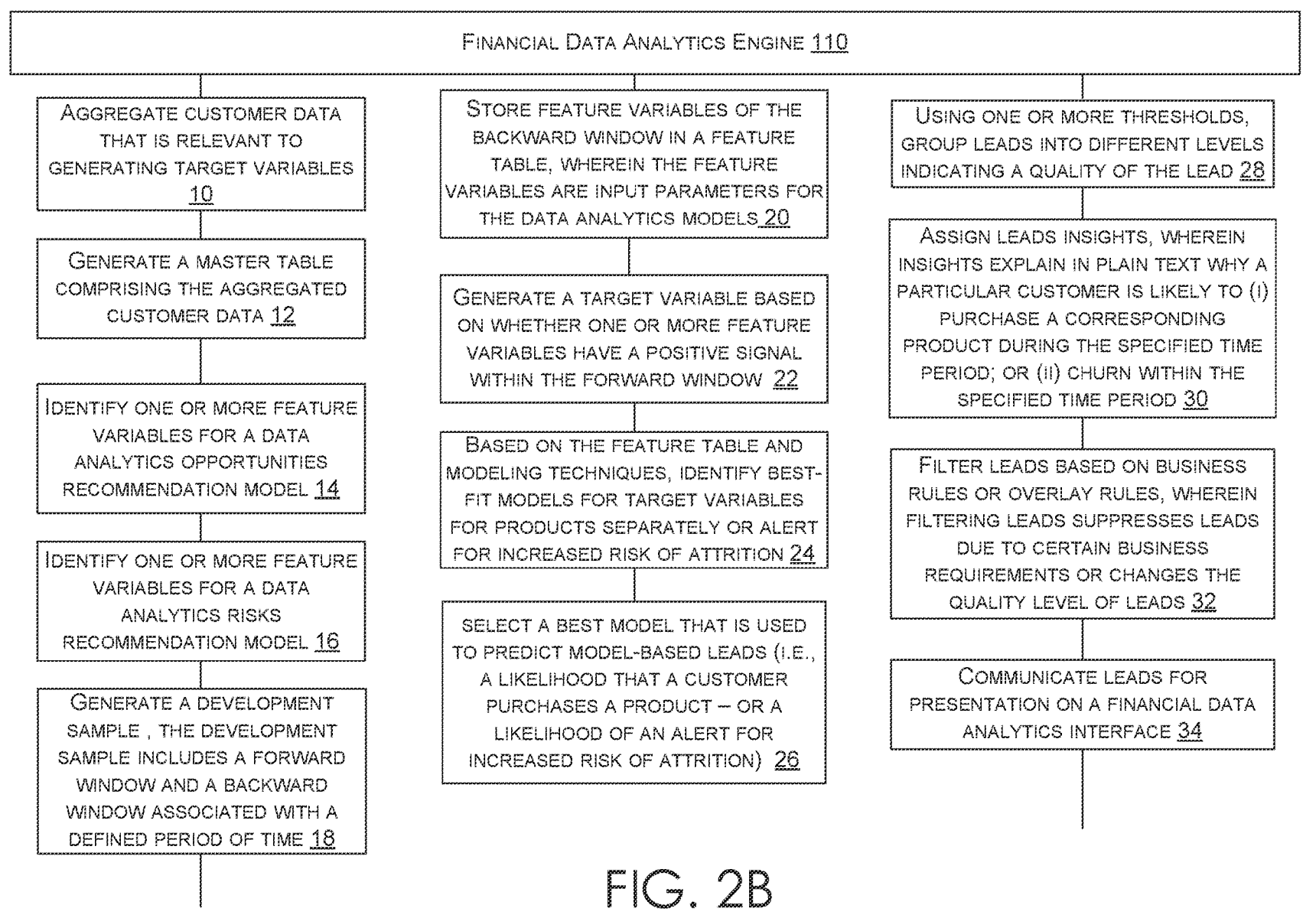

FINANCIAL DATA ANALYTICS ENGINE 110

AGGREGATE CUSTOMER DATA THAT IS RELEVANT TO GENERATING TARGET VARIABLES 10

GENERATE A MASTER TABLE COMPRISING THE AGGREGATED CUSTOMER DATA 12

IDENTIFY ONE OR MORE FEATURE VARIABLES FOR A DATA ANALYTICS OPPORTUNITIES RECOMMENDATION MODEL 14

IDENTIFY ONE OR MORE FEATURE VARIABLES FOR A DATA ANALYTICS RISKS RECOMMENDATION MODEL 16

GENERATE A DEVELOPMENT SAMPLE , THE DEVELOPMENT SAMPLE INCLUDES A FORWARD WINDOW AND A BACKWARD WINDOW ASSOCIATED WITH A DEFINED PERIOD OF TIME 18

STORE FEATURE VARIABLES OF THE BACKWARD WINDOW IN A FEATURE TABLE, WHEREIN THE FEATURE VARIABLES ARE INPUT PARAMETERS FOR THE DATA ANALYTICS MODELS 20

GENERATE A TARGET VARIABLE BASED ON WHETHER ONE OR MORE FEATURE VARIABLES HAVE A POSITIVE SIGNAL WITHIN THE FORWARD WINDOW 22

BASED ON THE FEATURE TABLE AND MODELING TECHNIQUES, IDENTIFY BEST-FIT MODELS FOR TARGET VARIABLES FOR PRODUCTS SEPARATELY OR ALERT FOR INCREASED RISK OF ATTRITION 24

SELECT A BEST MODEL THAT IS USED TO PREDICT MODEL-BASED LEADS (I.E., A LIKELIHOOD THAT A CUSTOMER PURCHASES A PRODUCT – OR A LIKELIHOOD OF AN ALERT FOR INCREASED RISK OF ATTRITION) 26

USING ONE OR MORE THRESHOLDS, GROUP LEADS INTO DIFFERENT LEVELS INDICATING A QUALITY OF THE LEAD 28

ASSIGN LEADS INSIGHTS, WHEREIN INSIGHTS EXPLAIN IN PLAIN TEXT WHY A PARTICULAR CUSTOMER IS LIKELY TO (I) PURCHASE A CORRESPONDING PRODUCT DURING THE SPECIFIED TIME PERIOD; OR (II) CHURN WITHIN THE SPECIFIED TIME PERIOD 30

FILTER LEADS BASED ON BUSINESS RULES OR OVERLAY RULES, WHEREIN FILTERING LEADS SUPPRESSES LEADS DUE TO CERTAIN BUSINESS REQUIREMENTS OR CHANGES THE QUALITY LEVEL OF LEADS 32

COMMUNICATE LEADS FOR PRESENTATION ON A FINANCIAL DATA ANALYTICS INTERFACE 34

FIG. 2B

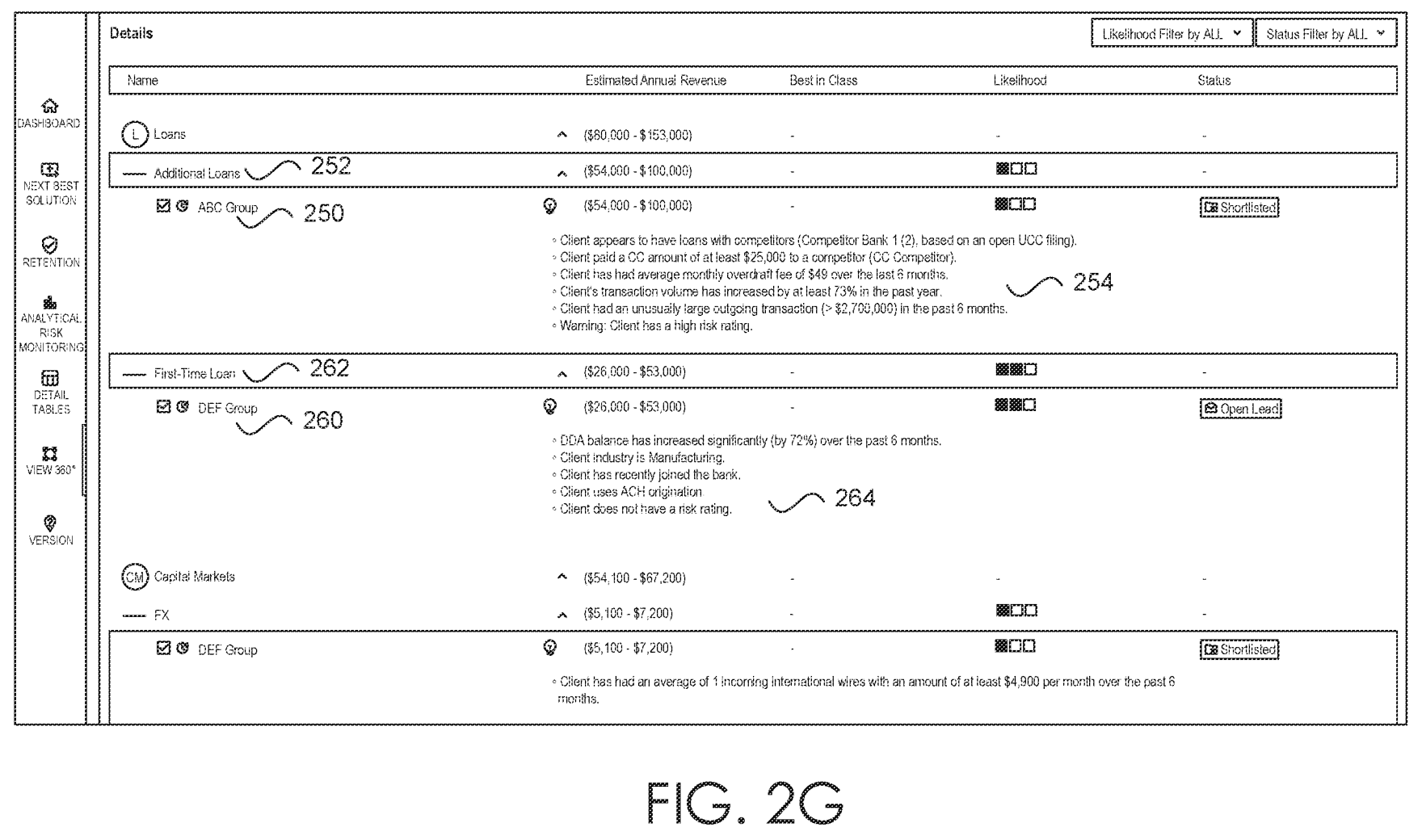

DASHBOARD
NEXT BEST SOLUTION
RETENTION
ANALYTICAL RISK MONITORING
DETAIL TABLES
VIEW 360°
VERSION

Details

Likelihood Filter by ALL
Status Filter by ALL

| Name | Estimated Annual Revenue | Best in Class | Likelihood | Status |
|---|---|---|---|---|
| (L) Loans | ($60,000 - $153,000) | - | - | - |
| Additional Loans 252 | ($54,000 - $100,000) | - | ■□□ | - |
| ABC Group 250 | ($54,000 - $100,000) | - | ■□□ | Shortlisted |
| First-Time Loan 262 | ($26,000 - $53,000) | - | ■■□ | - |
| DEF Group 260 | ($26,000 - $53,000) | - | ■■□ | Open Lead |
| (CM) Capital Markets | ($54,100 - $67,200) | - | - | - |
| FX | ($5,100 - $7,200) | - | ■□□ | - |
| DEF Group | ($5,100 - $7,200) | - | ■□□ | Shortlisted |

ABC Group (254):

- Client appears to have loans with competitors (Competitor Bank 1 (2), based on an open UCC filing).
- Client paid a CC amount of at least $25,000 to a competitor (CC Competitor).
- Client has had average monthly overdraft fee of $49 over the last 6 months.
- Client's transaction volume has increased by at least 73% in the past year.
- Client had an unusually large outgoing transaction (> $2,700,000) in the past 6 months.
- Warning: Client has a high risk rating.

DEF Group (264):

- DDA balance has increased significantly (by 72%) over the past 6 months.
- Client industry is Manufacturing.
- Client has recently joined the bank.
- Client uses ACH origination.
- Client does not have a risk rating.

DEF Group (FX):

- Client has had an average of 1 incoming international wires with an amount of at least $4,900 per month over the past 6 months.

FIG. 2G

| Estimated Annual Revenue | Best in Class | Likelihood | Status |
|---|---|---|---|
| ^ ($80,000 - $153,000) | - | - | - |
| ^ ($54,000 - $100,000) | - | ■□□ | - |
| ($54,000 - $100,000) | - | ■□□ 270A | Shortlisted 272A |

- Client appears to have loans with competitors (Competitor Bank 1 (2), based on an open UCC filing).
- Client paid a CC amount of at least $25,000 to a competitor (CC Competitor).
- Client has had average monthly overdraft fee of $49 over the last 6 months.
- Client's transaction volume has increased by at least 73% in the past year.
- Client had an unusually large outgoing transaction (> $2,700,000) in the past 6 months.
- Warning: Client has a high risk rating.

| Estimated Annual Revenue | Best in Class | Likelihood | Status |
|---|---|---|---|
| ^ ($26,000 - $53,000) | - | ■■□ | - |
| ($26,000 - $53,000) | - | ■■□ 270B | Open Lead 272B |

- DDA balance has increased significantly (by 72%) over the past 6 months.
- Client industry is Manufacturing.
- Client has recently joined the bank.
- Client uses ACH origination.
- Client does not have a risk rating.

FIG. 2H

FINANCIAL DATA ANALYTICS ENGINE ASSOCIATED WITH A CUSTOMER RELATIONSHIP MANAGEMENT SYSTEM

BACKGROUND

Many companies rely on data analytics systems for computational analysis of data to discover, interpret, and communicate important patterns in data. Furthermore, data analytics systems implement predictive analysis (e.g., a forecasting system) via machine learning analyzing historical data aiming to predict future events. For example, a predictive model may analyze transactional data to identify risks and opportunities. A data analytics system can operate on different types of datasets to train machine learning models and applying these. For example, a dataset can be used in a customer relationship management financial services tool, where the dataset includes detail on the customers, accounts, and transactions.

Conventionally, customer relationship management systems are not configured with a computing infrastructure and logic to provide insights that explain to the user—in an appropriate subject-specific and user-tailored way and language—why the underlying models recommend certain actions. In this way, conventional customer relationship management systems do not generate data for computer interfaces that provide guidance to an end-user (e.g., relationship manager) such that the end-user understands why the underlying model generated a particular recommendation (or with what talking points they could address the customer). As such, a more comprehensive customer relationship management system—having an alternative basis for providing data analytics operations—improves computing operations and interfaces in customer relationship management systems.

SUMMARY

Various aspects of the technology described herein are generally directed to systems, methods, and computer storage media, for among other things, providing financial data analytics recommendations ("recommendations") using a financial data analytics engine ("analytics engine") in a customer relationship management system. The recommendations can be a financial product lead ("lead") that is information associated with a model-generated suggested consumer solution or an alert of increased risk of attrition. The analytics engine is configured to generate recommendations based on generating values of variables associated with financial products. The analytics engine operates based on modeling techniques (e.g., statistical models and machine learning models) and rules (e.g., business rules or overlay rules). Generating the recommendations can also be based on different data aggregation levels (e.g., relationship-level, or customer-level) and product aggregation levels (i.e., combining products that fulfil similar needs while separating products that fulfill different needs). The model-generated recommendations are further enhanced in a number of subsequent steps. First, generating human-readable customer-specific or product-specific insights based on logic rules and SHAP (SHapley Additive exPlanations) values. Second, applying overlay rules to suppress or change recommendations. Third, calculating an expected monetary impact of the recommendation (i.e., the opportunity size).

Operationally, recommendations are generated based on (i) a leads computation and machine learning engine and (ii) logical rules—(e.g., statistical models, machine learning models, business rules and overlay rules). In a first step, target variables are created which indicate at which point in time a certain event took place (e.g., a customer purchased a product or left the bank). In a second step, feature variables (i.e., values for the selected feature variables associated with customer data) are generated by aggregation and transformation of customer data. Aggregation is typically done across different time periods, customer accounts, and data sources. Typical data transformations include—but are not limited to—the calculation of ratios of feature variables (e.g., number of wire transactions over total number of transactions), the calculations of trends (e.g., monthly increase in transaction volume), or the detection of keywords in transaction description.

In a third step, the leads computation and machine learning engine utilizes feature variables generated in the second step to identify patterns in the data that are able to predict the events, i.e., the target variables created in the first step. The detected patterns can be used to predict future events and generate recommendations. A recommendation can be generated along with insights that provide plain text explanations of the recommendations. In particular, for example, the insights express in plain text why a particular client is likely to purchase a specific product at this specific point in time—or is likely to leave within a specific period of time (e.g., in the next three months). These insights can include client-specific information that is extracted from client's data. The recommendation is caused to be presented on a financial data analytics interface along with financial data analytics interface elements (e.g., a dashboard and graphical visualizations including the financial product lead information).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIGS. 2A and 2B are block diagrams of an exemplary customer relationship management system with a financial data analytics engine, in which embodiments described herein may be employed;

FIGS. 2C-2I are exemplary schematics associated with a customer relationship management system with a financial data analytics engine, in which embodiments described herein may be employed;

DETAILED DESCRIPTION OF THE INVENTION

Overview

Figure 1A:
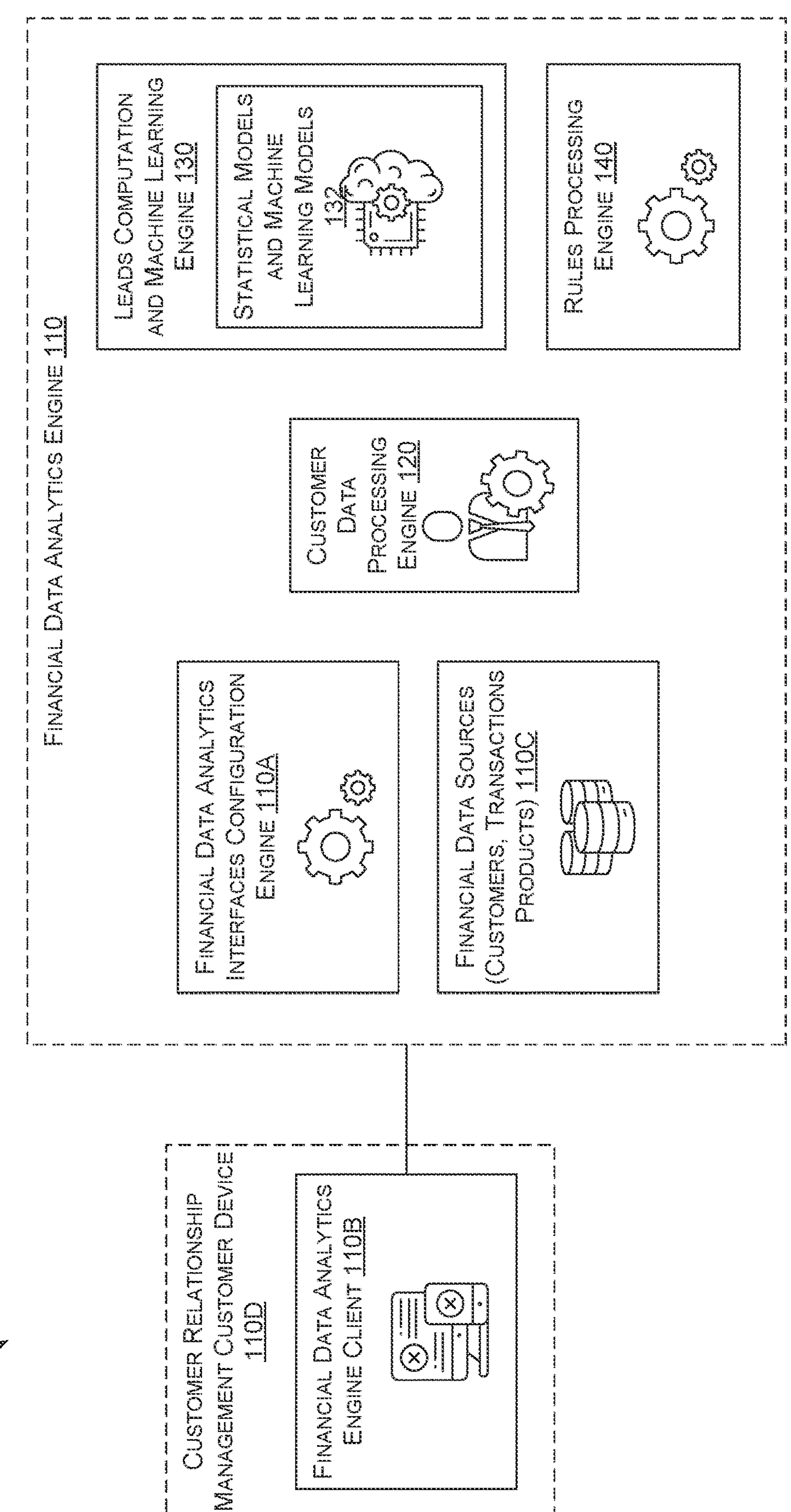
FIGS. 1A and 1B are block diagrams of an exemplary customer relationship management system with a financial data analytics engine, in which embodiments described herein may be employed.

By way of background, a data analytics system can support performing computational analysis of data to discover, interpret, and communicate important patterns in data. Many companies (e.g., retail, manufacturing, travel, construction) implement data analytics systems to gather, monitor, track, model, and deploy data-driven insights to create competitive advantages. Data analytics can include business analytics that includes iterative explorations and investigations of past business performance to gain insights and drive business planning. A data analytics system can operate based on different types of datasets to facilitate training machine learning models and performing predictive analysis. For example, a dataset can be used in a customer relationship management financial services tool, where the dataset includes details on customers, accounts, and transactions. Large datasets can lead to different types of big data problems and specifically limitations in making decisions based on the large datasets.

Conventionally, a customer relationship management system that operates based on data analytics, is not configured with a computing infrastructure and logic to provide additional human-readable insights that explain to the user in an appropriate subject-specific and user-tailored way—(e.g., in the terms and language of an industry, such as, relationship manager of bank)—why computing models recommended certain actions. In particular, a customer relationship management tool—that is used by a relationship manager and facilitates workflow planning—is not configured to intelligently aggregate and analyze datasets, to apply rules, or to provide these types of human-readable insights. It is, however, crucial that the end user understands why the model came up with the given recommendations for actions. Otherwise end users tend to question the results and—in the worst case—ignore the model output. Furthermore, it is especially important in commercial banking that the end user—which often is the relationship manager—gets talking points that the end user can leverage in a conversation with the customer.

Relationship managers in financial institutions (e.g., banks) typically have a large portfolio of customers. Within these large portfolios it can be challenging for a customer relationship manager to keep an overview of the data and the vast options of products to offer to customers. Customer relationship management tools may not be configured to predict which customers are likely to leave the bank (or churn) within a defined period of time or which customers are in need of which specific product at this specific point in time. It is of highest importance to approach the customer along with an understanding of why the customer needs a certain product at the specific point in time. Quantifying and qualifying such insights and providing the insights in a particular manner via an interface can increase the relationship managers' efficiency in selling additional solutions or preventing customers from leaving the bank.

Accordingly, conventional customer relationship management systems do not generate data for computer interfaces to provide guidance to the end user such that the end user understands why computing models generated particular recommendations or with what talking points they could address the customer. As such, a more comprehensive customer relationship management system—having an alternative basis for providing data analytics operations can improve computing operations and interfaces in customer relationship management systems.

Embodiments of the present disclosure are directed to systems, methods, and computer storage media, for among other things, providing financial data analytics recommendations ("recommendations") using a financial data analytics engine ("analytics engine") in a customer relationship management system. The recommendations can be a financial product lead ("lead") that is information associated with a model-generated suggested consumer solution or an alert of increased risk of attrition. The analytics engine is configured to generate recommendations based on generating values of variables associated with financial products. The analytics engine operates based on modeling techniques (e.g., statistical models and machine learning models) and rules (e.g., business rules or overlay rules). Generating the recommendations can also be based on different data aggregation levels (e.g., relationship-level, or customer-level) and product aggregation levels (i.e., combining products that fulfil similar needs while separating products that fulfill different needs). The model generated recommendations are further enhanced in a number of subsequent steps. First, generating human-readable customer-specific or product-specific insights based on logic rules and SHAP (SHapley Additive exPlanations) values. Second, applying overlay rules to suppress or change recommendations. Third, calculating the expected monetary impact of the recommendation (i.e., the opportunity size).

By way of context, advanced analytics and machine learning approaches allow learning from data and improving analysis via data analytics systems. Operationally, developing an advanced analytics or machine learning model can be performed via an underlying calculation kernel (e.g., machine learning engine) that supports gathering training data, defining goals and metrics associated with training data features or attributes (e.g., product features, customer features etc.) Machine learning techniques can include Linear/Logistic Regressions, Random Forest or Gradient Boosted Trees approaches to name a few. For example, a tree-based approach such as Random Forest or Gradient Boosted Trees that can be trained to predict future events. Such tree-based approaches are built on decision trees. A decision tree aims to segment a customer segment into subgroups that have different target rates (e.g., a key interest rate that a bank uses to guide monetary policy toward the desired economic outcomes) based on feature values.

When making a prediction for a new customer or an existing customer at a different point in time, the customer is assigned to one of the subgroups based on their feature values and the predicted likelihood corresponds to the target rate of that subgroup. The more advanced tree-based approaches grow a large number of such decision trees and perform an average over the results, making the predictions more accurate and stable, or use the subsequent tree to explain the remaining error of the previous tree. The predicted likelihood of these approaches is then used to derive a recommendation. At a high level, the machine learning engine can further support training the models (i.e., using historical data and algorithms), validation (i.e., optimizing model parameters and hyper-parameters, as well as ensuring stability), and deployment (e.g., integration into production use) across different types of computing environments.

Financial data analytics systems can be configured to operate with a customer relationship management system. A customer relationship management system can include a customer relationship management computing environment that supports a business or other organization in administering interactions with customers. A customer relationship management system may integrate and automate sales, marketing, and customer support. As such, the functionality described herein can support a customer relationship management system's capacity to compile data from a range of different communication channels in order to learn about target audiences and how best to cater to their needs to drive growth and retain customers.

As used herein, a target variable can refer to a variable whose values are to be modeled and predicted by other variables. For example, a supervised machine learning algorithm uses historical data to learn patterns and uncover relationships between features variables of a dataset and the target variables. The correct definition of target variables is of crucial importance for the quality of the recommendations. When the target variables are defined in a way that they are meaningful and actionable by a user (e.g., banking relationship manager) the resulting recommendations will be more helpful.

The financial data analytics engine then employs advanced statistical models and machine learning algorithms, and executes subsequent operations (e.g., application of business rules based on logical rules; generation of human-readable customer/product-specific insights based on logical rules and SHAP values; and application of overlay rules to suppress/change leads) to transform the predicted target variables into helpful and actionable recommendations. The correct choice of customer aggregation level (e.g., relationship/household-level compared to customer-level) and product aggregation level (i.e., combining products that fulfil similar needs while separating products that fulfil different needs) is key in financial data analytics engine operations. For example, while loans and specific accounts are often considered as being relevant on a customer-level as each individual company has a need for these products, other products like merchant services can be relevant at relationship/household-level as they are usually either used by the whole relationship/household or not at all.

Moreover, insights also tend to be more meaningful at one level or the other. For example, for loans and accounts it is relevant for the relationship manager to see the current financial situation or transaction behavior of the individual customer. But for merchant services, it is rather interesting on relationship/household level because it is unlikely that parts of the same relationship/household will use one merchant service solution while another part uses a different one. As such, it is a more interesting insight for the relationship manager which of the customers within the same relationship/household actually use merchant services (and with which dollar amounts) at an external provider, so that relationship manager can address the relevant person of the relationship/household and try to win the whole relationship/household over to use the bank's merchant service solution instead. The combination of the above-identified elements allows the creation of precise leads that that can be presented via a financial data analytics interface.

Accordingly, financial data analytics recommendations can be generated using predictive analytics on holistic customer data (e.g., customer data, transaction data, and product data) of a financial institution. Predictive analytics can be used to analyze the data to drive revenue, reduce cost and build loyalty for the financial institution. Predictive analytics can specifically include generating financial data analytics recommendations using data analytics models (e.g., a Next Best Solution Model or a Retention Model). Financial data analytics recommendations can correspond to offers that add the most value to the customer or increase retention rates, where the financial data analytics recommendations are generated using a financial data analytics engine associated with a customer relationship management system.

Figure 1B:
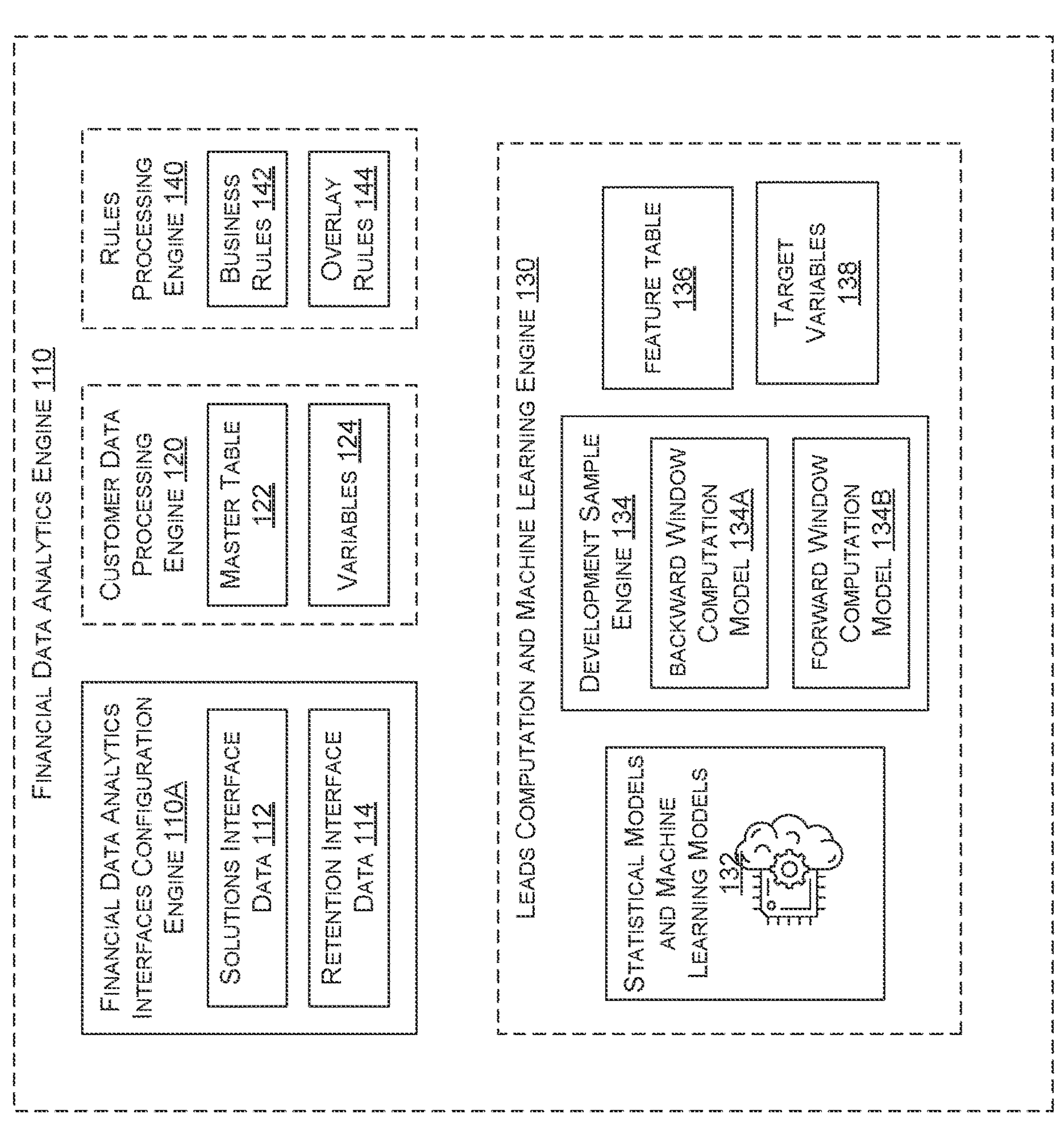
Figure 1C:
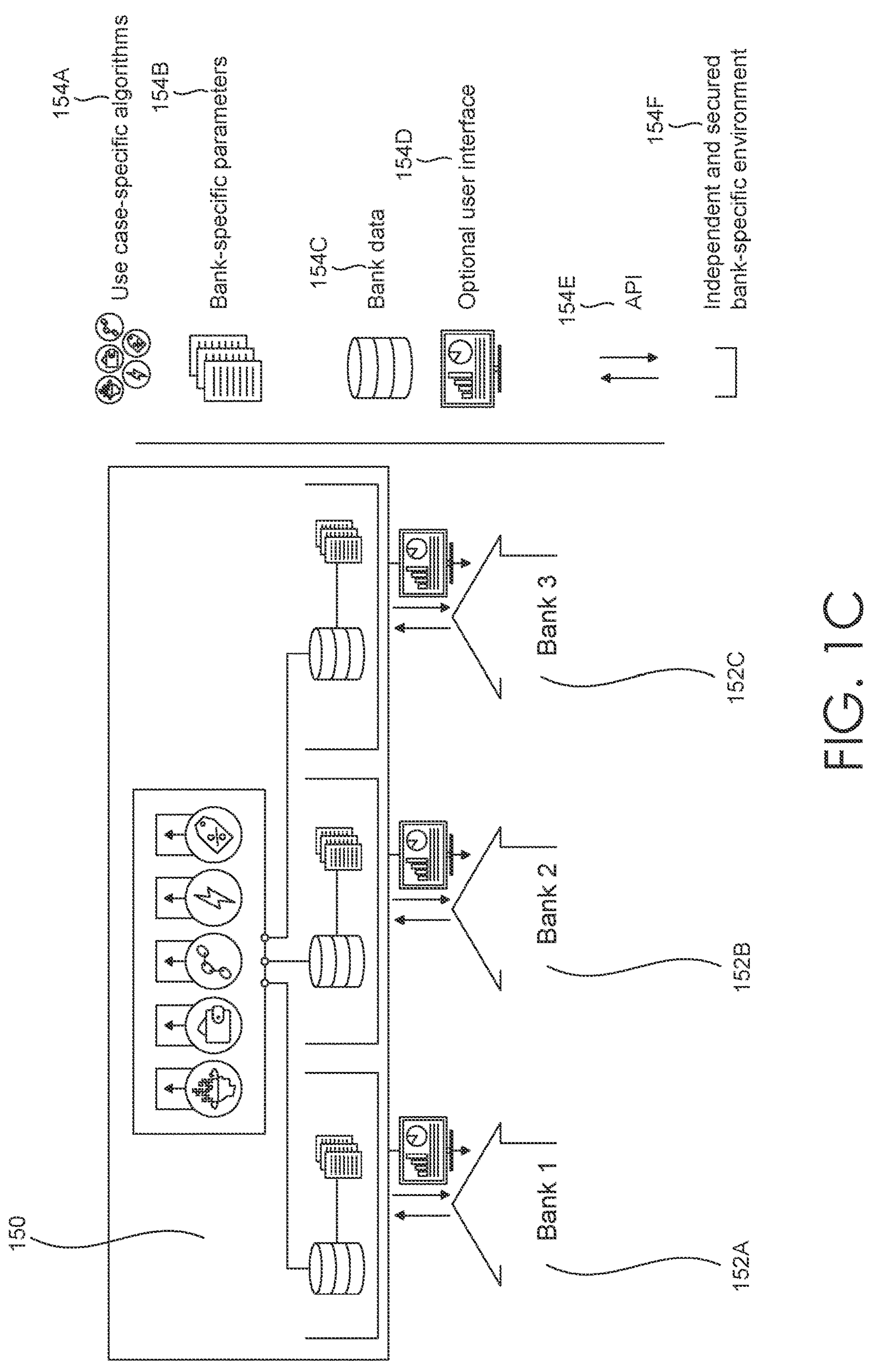
FIGS. 1C-1D are exemplary schematics associated with a customer relationship management system with a financial data analytics engine, in which embodiments described herein may be employed.

Aspects of the technical solution can be described by way of examples and with reference to FIGS. 1A, 1B, and 1C. FIG. 1A illustrates a data analytics system 100 including financial data analytics engine 110, financial data analytics interfaces configuration engine 110A, financial data analytics client 110B, financial data sources 110C, customer data processing engine 120, leads computation and machine learning engine 130 having statistical models and machine learning models 132 and rules processing engine 140.

With reference to FIG. 1B, FIG. 1B illustrates aspects of the financial data analytics engine 110. FIG. 1B includes financial data analytics interface configuration engine 110A having solutions interface data 112, retention interface data 114; customer data processing engine 120 having master table 122 and variables 124; leads computation and machine learning engine having statistical models and machine learning models 132, development sample engine 134 having backward window computation model 134A and forward window computation model 134B, and feature table 136; and rules processing engine 140 having business rules 142 and overlay rules 144.

The financial data analytics engine operates to create a master table that contains data from a variety of data sources (e.g., customer data, product data, and transaction data). The data is then connected in the master table, where all data associated with a particular customer is then stored for a defined period of time. For example, customer data associated with certain variables (e.g., aggregation variables) can be aggregated into monthly data chunks. The master table can be created to have one row per customer per month. The aggregated customer data of the master table can include, but is not limited to, identifying a last available value (e.g., month-end balance of the current account), identifying an average value (e.g., average utilization of a credit line during this month), identifying a sum (e.g., add the sum of all deposits), or identify a maximum value (e.g., identify the highest outbound transaction).

The feature variables and aggregated variables of the aggregated customer data can be used to develop data analytics models, where an aggregation variable can be associated with a single month, while a feature variable is generated based on analyzing variables including the aggregation variables across multiple months. The financial data analytics engine stores the target variables and the feature variables (e.g., in a feature table), the feature variables are used to predict the target variables. As discussed, the feature variables are created by aggregating the data points in the backward window to one variable, e.g., taking the highest value of the last six months, taking the last value of the last six months, or calculate a trend over the last six months.

The financial data analytics engine 110 supports generating a development sample (i.e., training data) associated with feature variables of a backward window (e.g., a backward window time period) and target variables of a forward window (e.g., a forward window time period). Operationally, the development sample defines a forward window and a backward window—associated with a defined period of time (alternatively referred to herein as "a time period"—for each customer). For example, a forward window (e.g., the six months from July to December of a given year) and a backward window (e.g., the six months from January to June in the same given year) can be developed for customers. Operationally, the backward window is used to create feature variables based on which the actual predictions are derived. The forward window is used to calculate the target variables (e.g., an indicator if the customer bought a product or whether the customer left the bank within the forward window). The models are then trained on these development samples in order to link the feature variables created in the backward window with the target variables in the forward window.

Moreover, training the data analytics models of the financial data analytics engine includes generating target variables by checking whether certain conditions are met within the forward window. With reference to the target variables described above—(i.e., customer "has" and/or "has purchased" a product for Next Best Solution; customer's revenue dropped by more than a given percentage ("soft churn") or dropped to zero ("hard churn") for Retention)—a determination is made whether each target variable has a positive signal within the forward window. The model input feature variables are generated using values from within the backward window—i.e., by aggregating the aggregated variables from the master table over the months of the backward window. These aggregations include, but are not limited to, taking the sum (e.g., add the number of transactions of the last six months), calculating the trend over time (e.g., calculate the increase/decrease of the account balance in the last six months), and calculating the standard deviation over time.

In this way, data analytics models are developed based on feature variables to predict target variables. For example, feature variables and target variables can help in predicting whether a customer purchases a product, owned a product, significantly reduced the revenue, or even stopped generating any revenue, where the feature variables are tracked for predefined period of time. For example, a data analytics model (e.g., a Next Best Solution model) can be generated for predicting target variables for each financial product. The target variables can indicate whether (i) the customer purchased this product in this month and/or (ii) owned the product in this month. In another example, another data analytics model (e.g., a Retention model) can be generated for predicting target variables for customer action. The target variables can indicate whether (i) the customer had—on average—positive revenues in the last months but zero revenue in the subsequent months (so-called "hard churn"), and/or (ii) whether the customer's average revenue from the last months dropped by more than a given percentage compared to the average of this and the subsequent months (so-called "soft churn"). It is contemplated that the number of months over which the averages are calculated and the threshold which is applied for soft churn or hard churn can be varied to find the best results.

The feature table can be processed using a variety of statistical models (e.g., logistic regression/ordered logic model) and machine learning models (e.g., Random Forest, XGBoost, Neural Networks). The models are fitted using both target variables and feature variables for all products separately to find the models with the best fit. After the best model is selected for each use case, i.e., product recommendation or attrition alert, these models are used to predict with which likelihood a customer purchases this product in the next months (in the forward window) or with which likelihood the customer leaves the bank. Thresholds are chosen that group the leads into different levels (e.g., high, medium, low) indicating the likelihood of a positive outcome (e.g., that the customer purchases a product or leaves the bank).

In addition to these model-based leads, further leads are created by so-called scoring model based business rules. The underlying scoring models are based on experience and use combinations of logical conditions on the feature variables to generate leads. Leads are generated in such a way are also grouped into the different likelihood levels mentioned above based on the score they were assigned by the business rules. For example, these business rules may include, but are not limited to recommending a product to all customers that exceed a certain transaction volume, that have an acceptable risk class, and that have received a large incoming payment during the past six months. Afterwards, all created leads are equipped with so-called "insights". These insights express in plain text why a particular customer is likely to purchase this specific product at this specific point in time—or is likely to churn within the next months.

The insight creation in general uses two approaches: (i) a combination of logical conditions on the feature variables, and (ii) logical conditions on the model variable importance—utilizing, for example, SHAP values (e.g., "A unified approach to interpreting model predictions". S. M. Lundberg and S.-I. Lee, Advances in Neural Information Processing Systems 30 (2017) incorporated herein by reference) to determine variable importance within the model. At a high value, the Shapley value provides a principled way to explain the predictions of nonlinear models in the field of machine learning. By interpreting a model trained on a set of features as a value function on a coalition of data, Shapley values provide a natural way to compute which features contribute to a prediction. Insights are written in plain text and are enriched by including the values from the specific data fields for the customer. In the specific case of the scoring model based business rules the insights are generated following approach (i).

As a last step, all leads are filtered by overlay rules that may either suppress leads due to certain business requirement (e.g., do not generate leads for savings products during times of low interest rates) or change the quality level of leads (e.g., if it is known that the bank historically undersold a product, it might make sense to increase the number of leads for this product). After the overlays are applied, the leads and insights are sent to the relationship manager to support them in offering the right products at the right time or contact customers that have a high likelihood to churn leading to reduction in revenue for the bank.

As such, embodiments described herein can be configured to provide financial data analytics recommendations for a financial data analytics engine associated with a customer relationship management system. In one embodiment, by way of example, a machine learning model is trained to predict events as defined by the target variables based on training data comprising, for example—but not limited to—client data, transaction data, and product data. Data (e.g., bank's data on an ongoing basis) is analyzed using the trained machine learning model to generate model results. Based on the model results, a financial data analytics recommendation associated with an opportunity to sell a product or associated with a customer at risk of attrition can be generated. The financial data analytics recommendation is communicated along with a plurality of insights for presentation on a financial data analytics interface.

With reference to FIG. 1C, FIG. 1C illustrates aspects the data analytics system 100 including financial data analytics engine 110 provided via a web-service (e.g., web-service 150). The web-service 150 can support operations and communications between computing devices in the data analytics system 100. The web-service 150 can be implemented such that a plurality of users of the web-service (e.g., bank 152A, bank 152B, and 152C) have corresponding operating environments for executing operations with the web-service 150 that provide the functionality described herein. The web-service operating environment can include standardized and tailored operating environment features. For example, the operating environment can include use case-specific algorithms 154A, bank-specific parameters 154B, bank data 154C, optional user interface 154D, Application Programming Interfaces (APIs) 154E, and independent and secured bank-specific environment 154F.

Figure 1D:
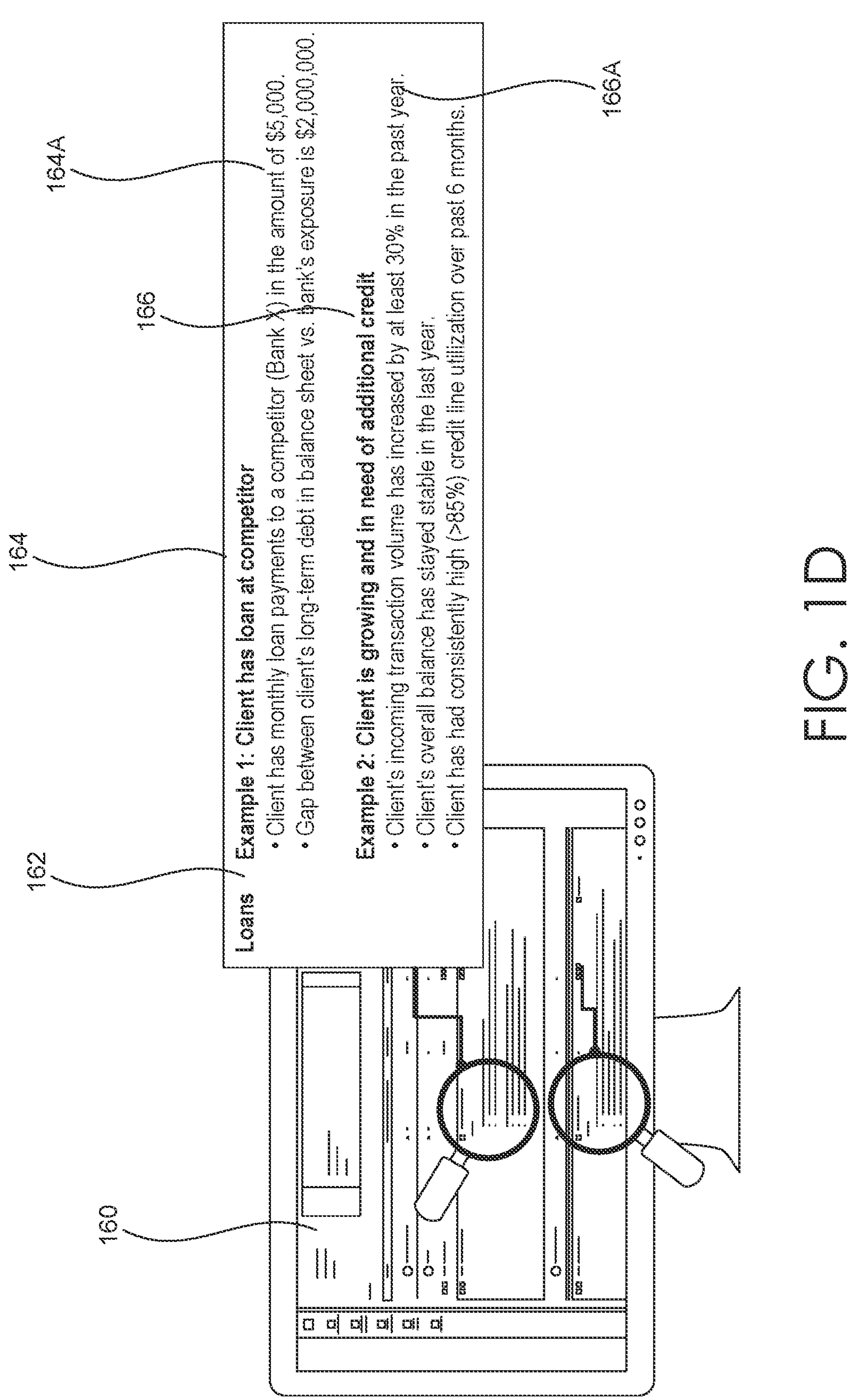

Turning to FIG. 1D, FIG. 1D illustrates a financial data analytics interface 160 associated with the financial data analytics engine 110. In particular, the financial data analytics interface 160 supports causing display of human-readable insights that act as talking points for a relationship manager and improves targeted processing and corresponding interfaces. The financial data analytics interface 160 can include leads interface portion 162 having leads (e.g., lead 164 and lead 166) for a product and a client and corresponding insights (e.g., insight 164A and insight 166A). For example, a lead can suggest that a relationship manager sell a specific product to a specific client. Leads are displayed in combination with insights that highlight information about the client that is extraordinary and explains why this particular client needs this specific product at this point in time.

Figure 2A:
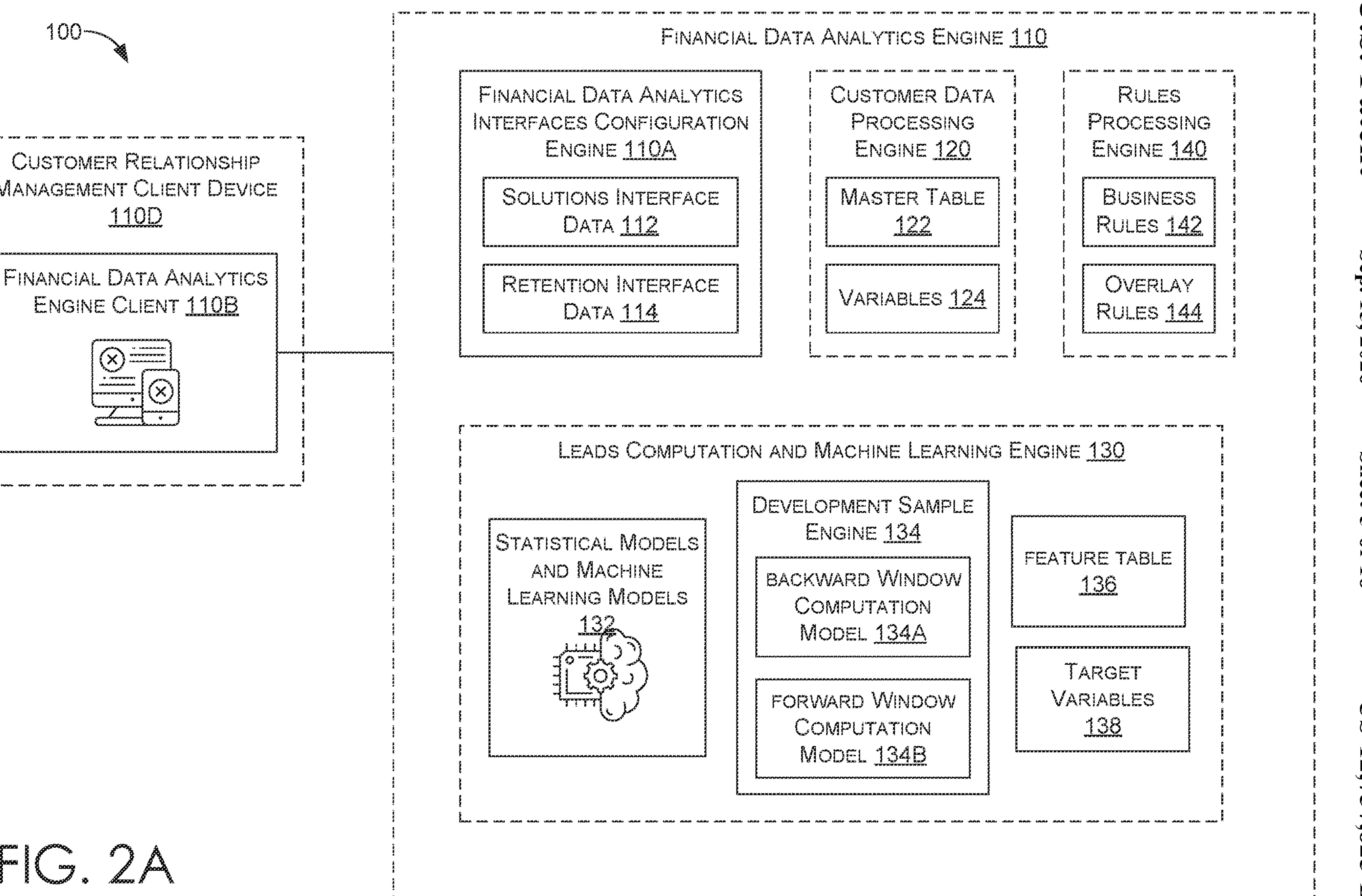

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally, the technical solution environment includes a technical solution system suitable for providing the example data analytics system 100 in which methods of the present disclosure may be employed. In particular, FIG. 2A shows a high-level architecture of the data analytics system 100 in accordance with implementations of the present disclosure. Among other engines, managers, generators, selectors, or components not shown (collectively referred to herein as "components"), the technical solution environment of data analytics system 100 corresponds to FIGS. 1A and 1B.

With reference to FIG. 2A, FIG. 2A illustrates data analytics system 100 including financial data analytics engine 110, financial data analytics interfaces configuration engine 110A, customer relationship management client device 110D, financial data analytics engine client 110B, customer data processing engine 120, leads computation and machine learning engine 130, and rules processing engine 140. With reference to FIG. 2B, FIG. 2B includes the financial data analytics interface configuration engine 110A having solutions interface data 112, retention interface data 114; customer data processing engine 120 having master table 122 and supplemental variables 124; leads computation and machine learning engine having statistical models and machine learning models 132, development sample engine 134 having backward window computation model 134A and forward window computation model 134B, and feature table 136; and rules processing engine 140 having business rules 142 and overlay rules 144.

The financial data analytics engine 110 supports providing financial data analytics recommendations in a customer relationship management system associated with the customer relationship management client device (e.g., customer relationship management client device 110D). The customer relationship management device is associated with a customer relationship management system that supports compiling data from a range of different communication channels in order to learn about target audiences and how best to cater to their needs to drive growth and retain customers.

The financial data analytics recommendations can be presented using a financial data analytics engine client (e.g., financial data analytics engine client) that is associated with a financial data analytics interface. The financial data analytics recommendations can include financial product lead information that is associated with a model-generated suggested consumer solution or an alert of increased risk of attrition (or default). The financial data analytics recommendation can be configured for presentation based on financial data analytics recommendations interface elements generated via the financial data analytics engine (e.g., financial data analytics interface configuration engine 110A having a solution interface data 112 and retention interface data). In particular, financial data analytics recommendations interface elements for suggested consumer solutions can include solutions interface data (e.g., solutions interface data 112) and financial data analytics interface elements for an alert of increased risk of attrition can include retention interface data (e.g., retention interface data 114). The solution interface data and retention interface data can include insights that express in plain text the recommendations. The solution interface data and the retention interface data correspond to interface elements described with reference to FIG. 2C-2I.

The customer data processing engine 120 processes customer data (including input data). Processing customer data can include aggregating the customer data at different aggregation levels. For example, data aggregation levels (e.g., relationship-level or customer-level) and product aggregation levels (i.e., combining products that fulfil similar needs while separating products that fulfill different needs). The different aggregation levels support generating the financial data analytics recommendations. Data associated with feature variables (e.g., variables 124) is aggregated and transformed from customer data, where aggregation is associated with different time periods, customer accounts, and data sources. The customer data processing engine 120 further supports a master table 122 and associated with relevant variables 124 from customer data. The master table 122 that contains data from a variety of data sources (e.g., customer data, product data, and transaction data). The data is then connected in the master table, where all data associated with a particular customer is then stored for a defined period of time.

The leads computation and machine learning engine 130 computes and stores the target variables (e.g., target variables 138) and the feature variables (e.g., feature table 136) that are used to predict the target variables. Training data (e.g., development sample of the development sample engine 134) is associated with feature variables of a backward window (e.g., a backward window time period) and target variables of a forward window (e.g., a forward window time period). Operationally, the development sample defines a forward window and a backward window—associated with a defined period of time. Operations associated with the backward window can be performed via the backward window computation model 134A and operations associated with the forward window can be performed via the forward window computation model 134B. Statistical models and machine learning models 132 can include—but are not limited to—logistic regression or ordered logic models and tree-based machine learning models (e.g., Random Forest or Gradient Boosted Trees) respectively, that can be trained to predict future events.

The feature variables are created by aggregating the data points in the backward window to one variable (e.g., taking the highest value of the last six months, taking the last value of the last six months, calculate a trend over the last six months). The target variables are generated based on checking whether certain conditions are met within the forward window. At a high level, leads computation and machine learning engine 130 supports detecting patterns in customer data using feature variables (e.g., variables 124) from the customer data processing engine 120. The detected patterns can be used to predict futures events and generate recommendations.

The leads computation and machine learning engine 130 also supports generating the human-readable customer-specific or product specific insights logic rules and SHAP (SHapley Additive exPlanations) values. The leads computation and machine learning engine 130 further supports calculating an expected monetary impact of the financial data analytics recommendation as an opportunity size (i.e., a quantified value or range of values to a potential impact of a course of action). The rules processing engine 140 including business rules 142 and overlay rules can support identifying a subset of financial data analytics recommendations for a global set of financial data analytics recommendations. The rules processing engine 140 operates to apply business rules based on a scoring model that uses logical conditions on feature variables to generate leads and further apply overlay rules that suppress or change leads in the financial data analytics recommendations.

With reference to FIG. 2B, FIG. 2B includes the financial data analytics engine 210 that supports performing operations to provide financial data analytics recommendations. At block 10, aggregate customer data that is relevant to generating target variables or predicting target variables (feature variables). At block 12, generate a master table comprising the aggregated customer data. At block 14, identify feature variables for a data analytics opportunities recommendation model (e.g., a Next Best Solution Model). At block 16, identify feature variables for a data analytics risks recommendation model (e.g., Retention Model).

At block 18, generate a development sample, the development sample includes a forward window and a backward window associated with a defined period of time. At block 20, store feature variables of the backward window in a feature table. The feature variables are input parameters for the data analytics models. At block 22, generate a target variable based on whether the feature variables have a positive signal within the forward window. At block 24, based on the feature table and modeling techniques, identify best-fit models for target variables for products (separately) or alert for increased risk of attrition. At block 26, select a best model that is used to predict model-based leads (i.e., a likelihood that a customer purchases a product or a likelihood of an alert for increased risk of attrition).

At block 28, using one or more thresholds, group leads into different levels indicating a quality of the lead. At block 30, assign leads insights. Insights explain in plain text why a particular customer is likely to (i) purchase a corresponding product during the specific time period of time; or (ii) churn within the specified time period. At block 32, filter leads based on overlay rules. Filtering the leads suppresses leads due to certain business requirements or changes the quality level of leads. At block 34, communicate leads for presentation on a financial data analytics interface.

With reference to FIGS. 2C-2I, FIG. 2C-2I illustrates aspects—interface representations—associated with the financial data analytics engine 110, the financial data analytics interfaces configuration engine 110A, and the financial data analytics engine client 110B. At a high level, the financial data analytics interfaces configuration engine 110A operates to generate interface data (e.g., solutions interface data 112 and retention interface data 114). Interface data includes user interface elements, financial data analytics data, and instructions on how to generate corresponding user interfaces that support interactions between users and the customer relationship management system.

User interfaces allow effective operation and control by users while the customer relationship management system simultaneously perform computing operations. Interface data can include graphical user interfaces that allow users to interact with the customer relationship management system (e.g., customer relationship management tool) through graphical user interface elements. A graphical user interface can include a dashboard that provides a visual display of data (e.g., solutions interface data 114 and retention interface data). The solution interface data and retention interface data can specifically include human-readable insights (e.g., plain-text or text-based graphical user interface elements) that explain to the user in an appropriate subject-specific and user-tailored way why computing models recommended certain actions.

Figure 2C:
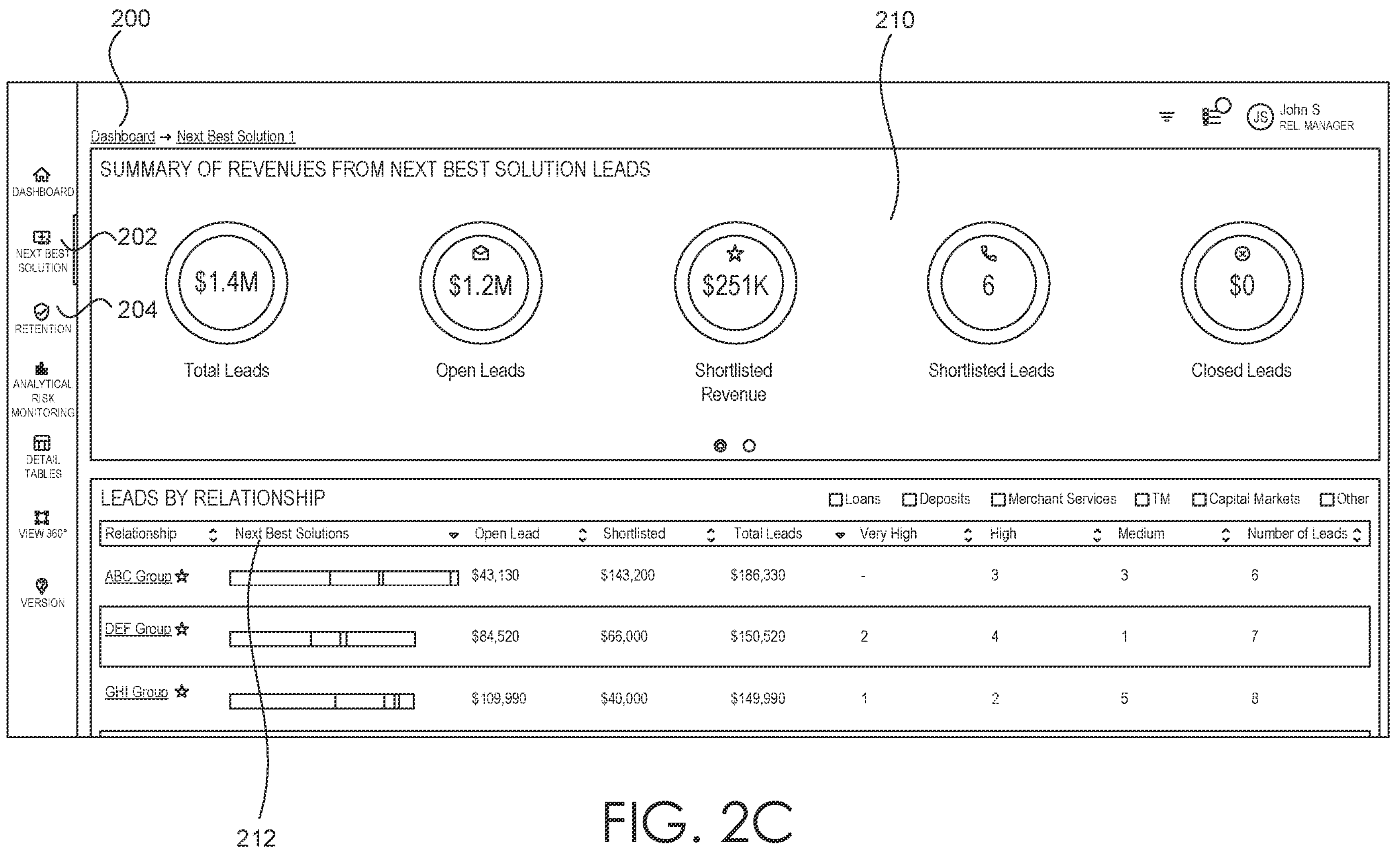
Figure 2D:
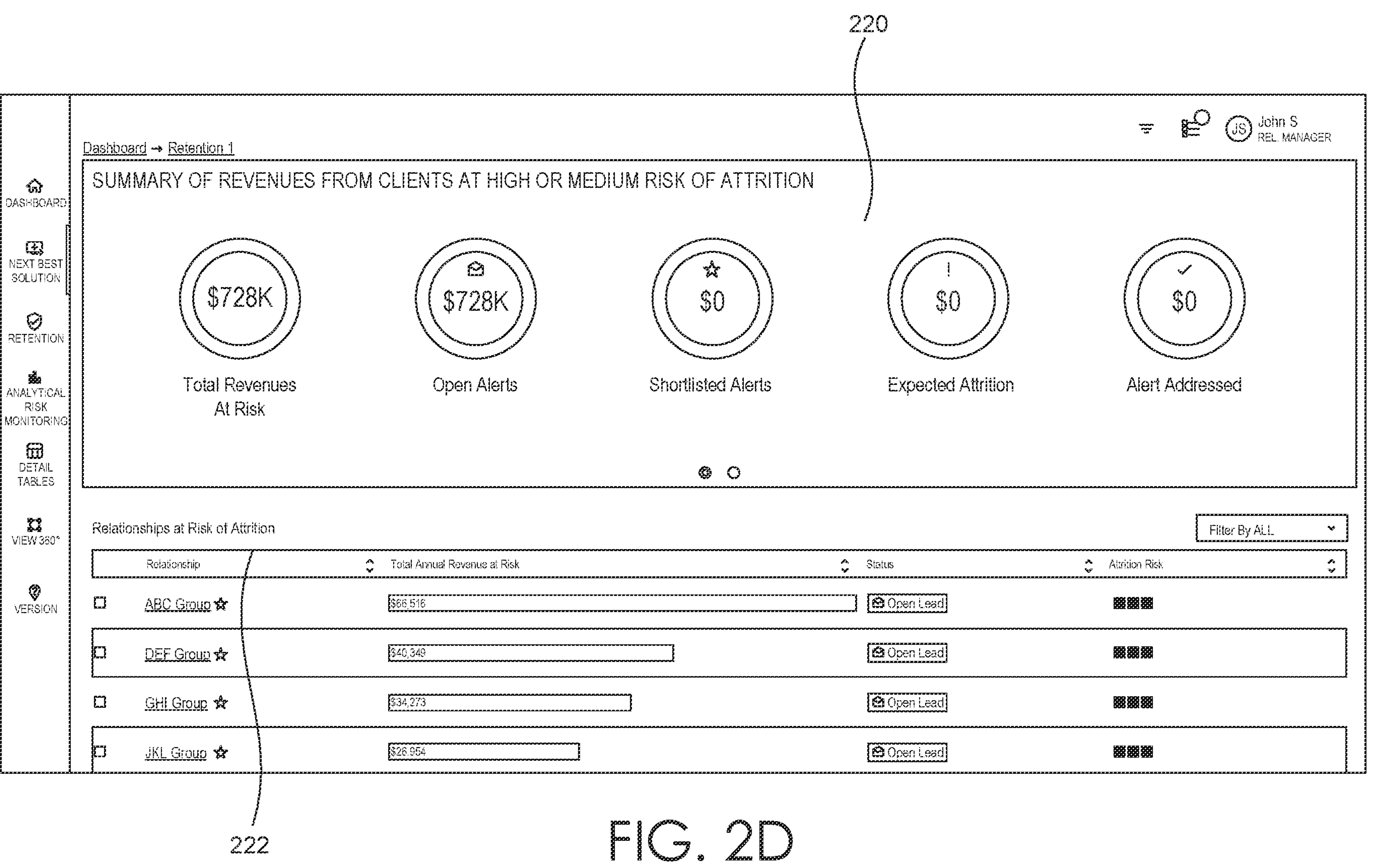

With reference to FIGS. 2C and 2D, FIGS. 2C and 2D illustrate a financial data analytics interface dashboard 200 ("dashboard") that provides at-a-glance views and detail views of key performance indicators relevant to the financial data analytics engine functionality described herein. The dashboard 200 can be used to cause display of information associated with model-generated suggested consumer solutions or alerts of increased risk of attrition. The dashboard 200 can include interface elements associated with Next Best Solution (e.g., Next Best Solution icon 202) and Retention (e.g., Retention icon 204).

As shown in FIG. 2C, the dashboard 200 can include global summary of Next Best Solution data (e.g., a Next Best Solution interface portion 210 that includes leads summary information including: total leads, open leads, shortlisted revenue, and shortlisted leads). The dashboard 200 can include a Leads By Relationship interface portion 212 that can be used to display leads based on selected ranking and sorting criteria. As shown in FIG. 2D, the dashboard 200 can include global summary of retention data (e.g., retention interface portion 220 that includes risk of attrition summary information including: total revenues at risk, open alerts, shortlisted alerts, and expected attrition). The dashboard 200 can include a Relationships at Risk of Attrition interface portion 222 that can be used to display leads based on selected ranking and sorting criteria.

Figure 2E:
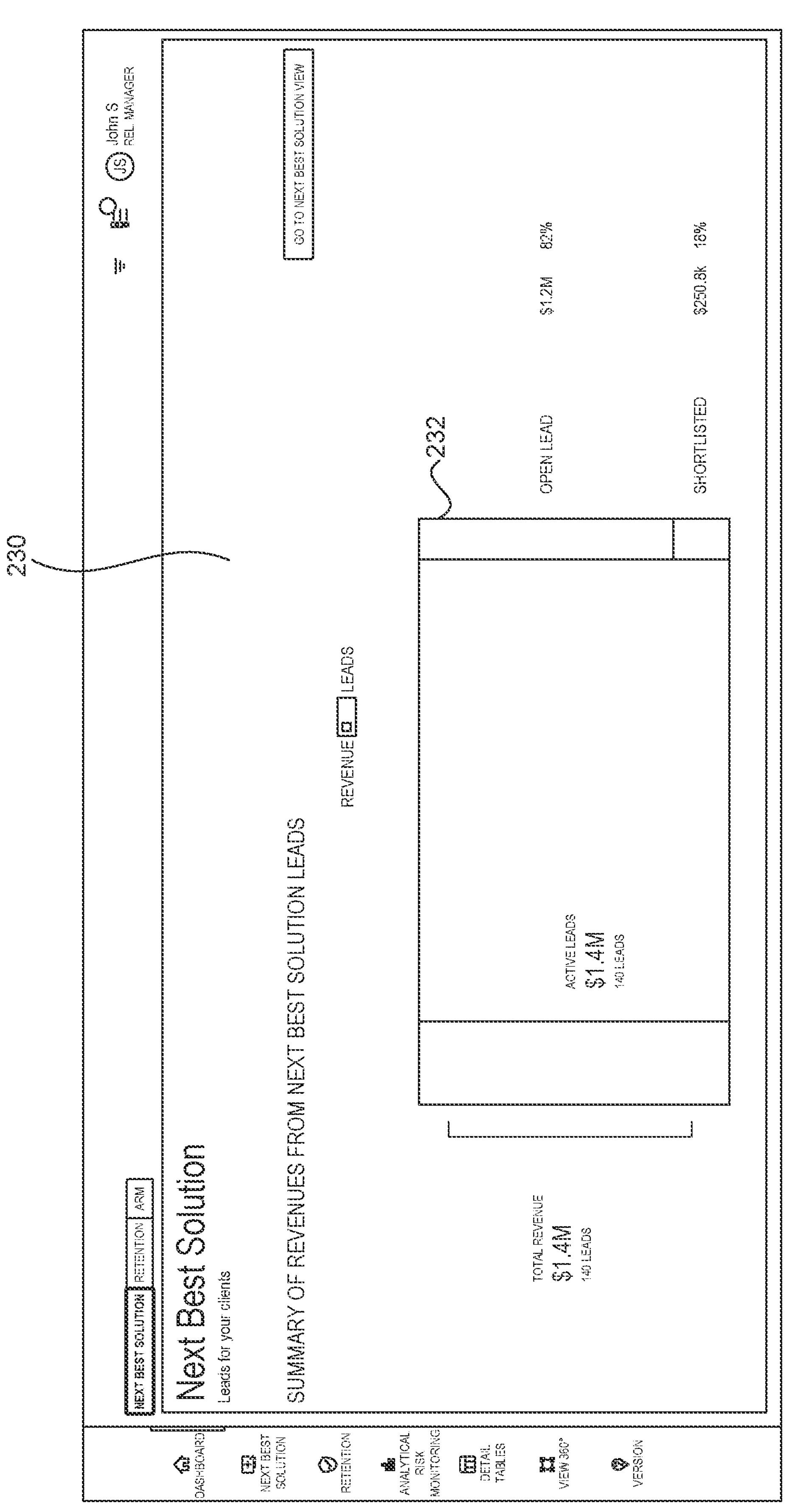
Figure 2F:
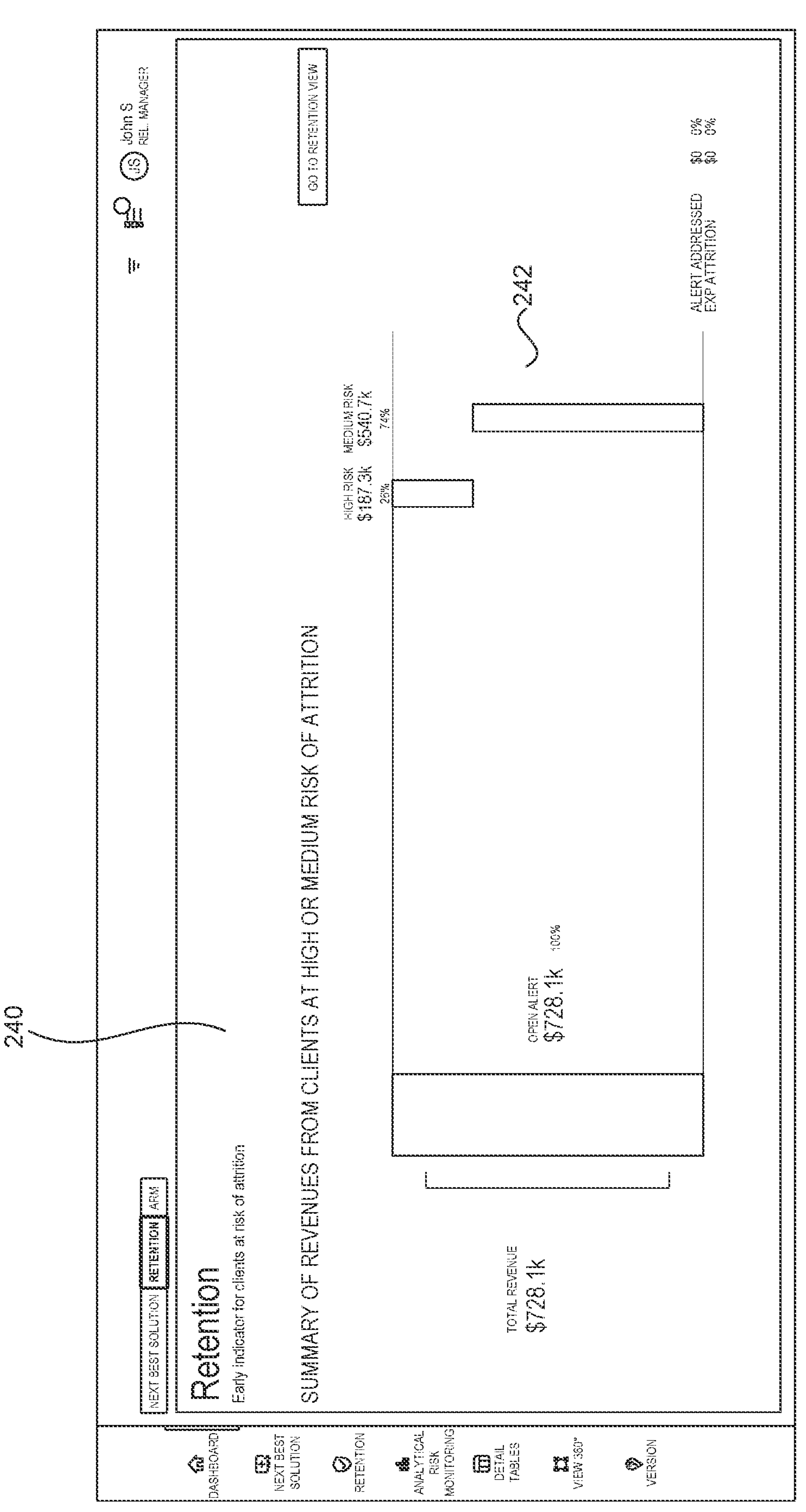

Turning to FIGS. 2E and 2F, FIG. 2E illustrates a Next Best Solution interface portion 230 that includes revenues from next best solution leads summary data and a visualization 212 associated with the data. FIG. 2F illustrates a retention interface portion 240 that includes revenues from clients at high or medium risk of attrition summary data 242 and a visualization associated with the data. As shown in FIG. 2G, FIG. 2G displays recommendation data for loans for a first customer (i.e., ABC Group 250; additional loans 252) and a second customer (i.e., DEF Group 26; first-time loan 262), where the recommendation data includes insights that provide plain text explanations. For example, insight 254 recites "Client's transaction volume has increased by at least 73% in the past year.") and insight 264 "Client uses ACH origination." FIG. 2H illustrates different categories (e.g., Estimated Annual Revenue, Best in Class, Likelihood and Status) for sorting and presenting the financial data analytics recommendations. The attributes of the category can be visualizations (e.g., Likelihood visualization 270A and 270B) or text (e.g., Status: Shortlisted 272A and Status: Open Lead 27B).

Figure 2I:
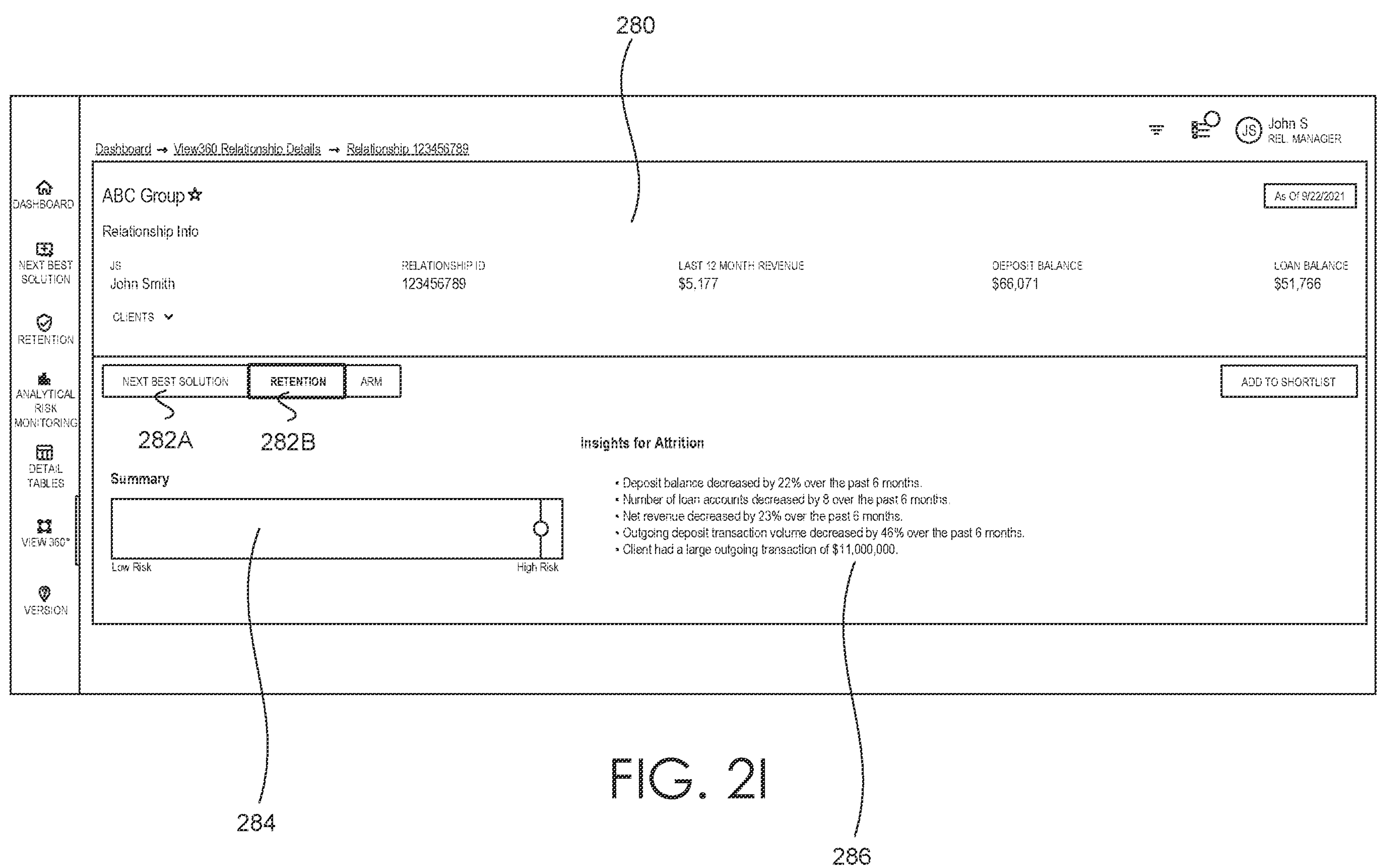

With reference to FIG. 2I, FIG. 2I illustrates a relationship view interface 280 of the dashboard 200. The relation view interface 280 can display relationship information (e.g., last 12 month revenue and deposit balance) and provide selectable icons for Next Best Solution (e.g., Next Best Solution icon 282A) and Retention (e.g., Retention icon 282B) for view corresponding information (e.g., visualizations and recommendation data including insights). For example, icon Retention icon 282B can be selected to show attrition visualization 284 and insights for attrition 286. Other variations and combinations of dashboard features that correspond to data associated with Next Best Solution and Retention in accordance with embodiments described herein are contemplated.

Exemplary Methods

Figure 3:
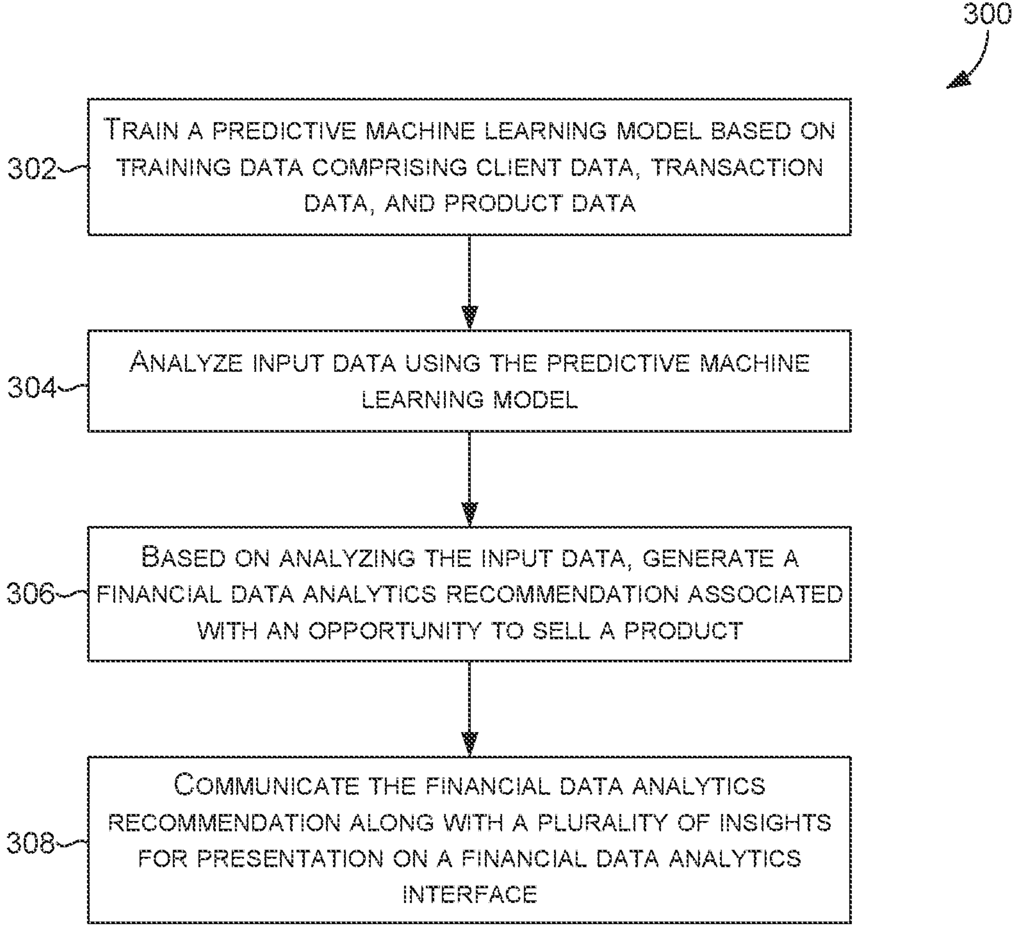
FIG. 3 is a flow diagram showing an exemplary method for implementing a customer relationship management system with a financial data analytics engine, in accordance with embodiments described herein.
Figure 4:
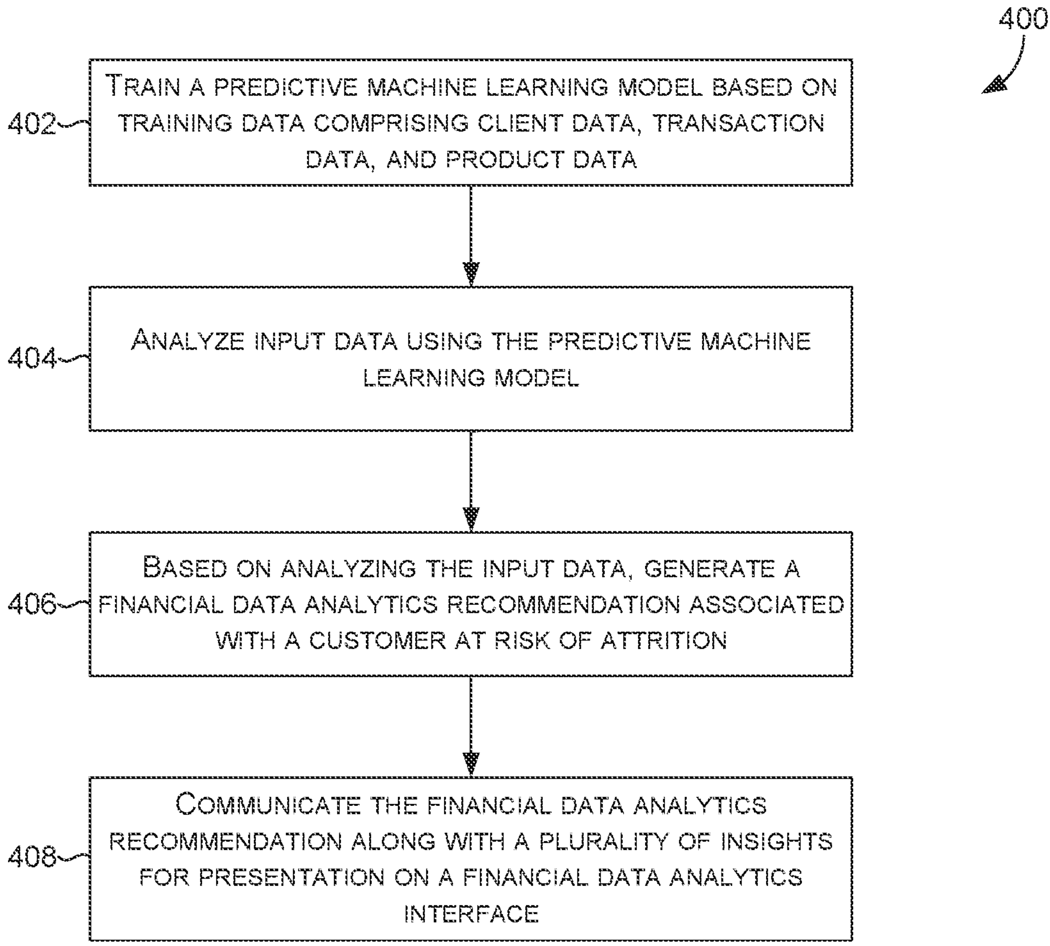
FIG. 4 is a flow diagram showing an exemplary method for implementing a customer relationship management system with a financial data analytics engine, in accordance with embodiments described herein.
Figure 5:
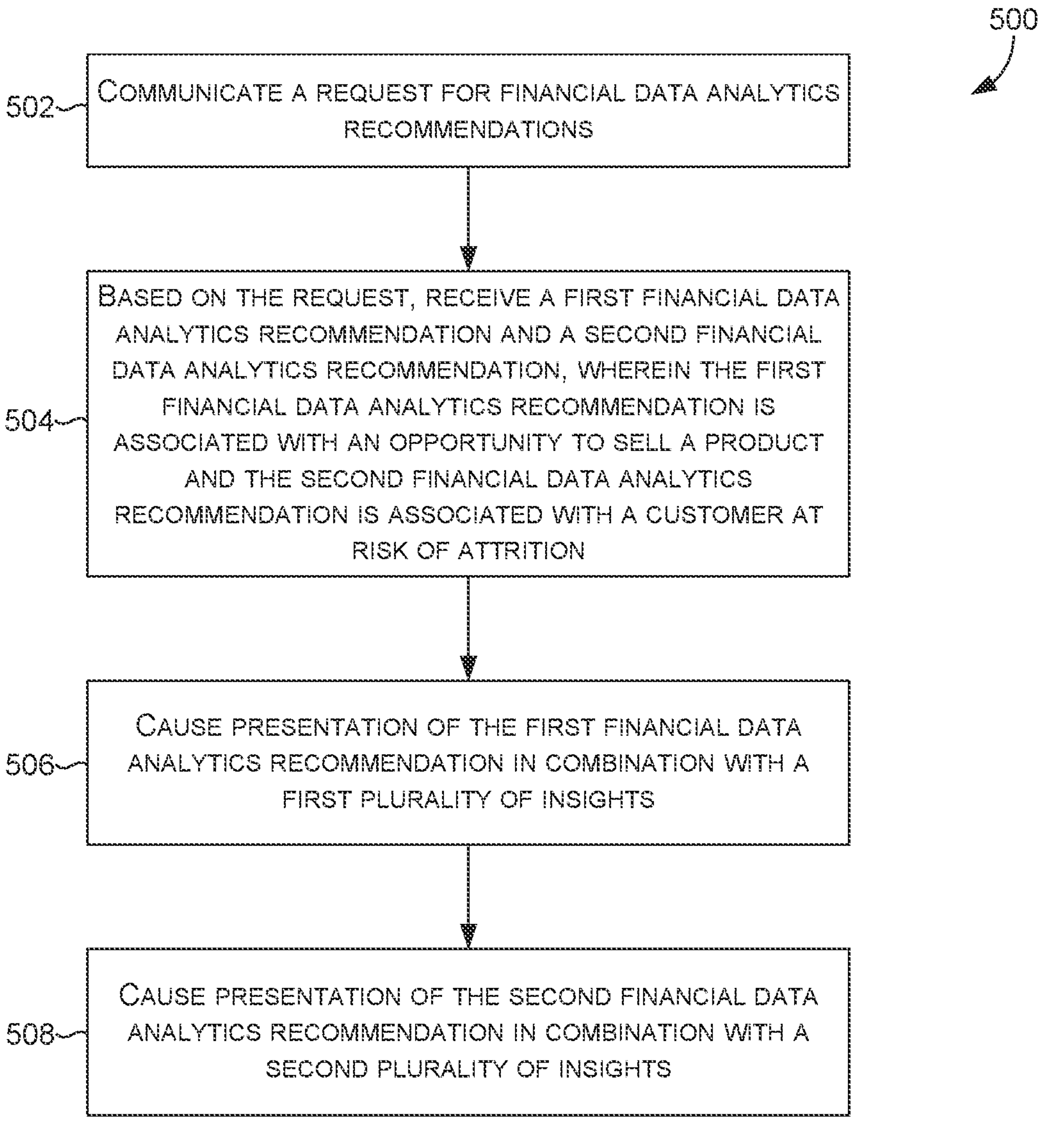
FIG. 5 is a flow diagram showing an exemplary method for implementing a customer relationship management system with a financial data analytics engine, in accordance with embodiments described herein.

With reference to FIGS. 3, 4 and 5, flow diagrams are provided illustrating methods for providing financial data analytics recommendations for a financial data analytics engine association with a customer relationship management system. The methods may be performed using the data analytics system described herein. In embodiments, one or more computer-storage media having computer-executable or computer-useable instructions embodied thereon that, when executed, by one or more processors can cause the one or more processors to perform the methods (e.g., computer-implemented method) in the customer relationship management system (e.g., a computerized system or computing system).

Turning to FIG. 3, a flowing diagram is provided that illustrates a method 300 for providing financial data analytics recommendations for a financial data analytics engine associated with a customer relationship management system. At block 302 train a predictive machine learning model based on training data comprising client data, transaction data, and product data. At block 304, analyze, using the machine learning model, input data of a customer that is managed via a customer relationship management system. At block 306, based on analyzing the input data, generate a financial data analytics recommendation associated with an opportunity to sell a product. At block 308, communicate the financial data analytics recommendation along with a plurality of insights for presentation on a financial data analytics interface.

Turning to FIG. 4, a flowing diagram is provided that illustrates a method 400 for providing financial data analytics recommendations for a financial data analytics engine associated with a customer relationship management system. At block 402 train a machine learning model based on training data comprising client data, transaction data, and product data. At block 404, analyze, using the predictive machine learning model, input data of a customer that is managed via a customer relationship management system. At block 406, based on analyzing the input data, generate a financial data analytics recommendation associated with a customer at risk of attrition. At block 408, communicate the financial data analytics recommendation along with a plurality of insights for presentation on a financial data analytics interface.

Turning to FIG. 5, a flowing diagram is provided that illustrates a method 500 for providing financial data analytics recommendations for a financial data analytics engine associated with a customer relationship management system. At block 502, communicate, from a data analytics engine client, a request for financial data analytics recommendation. At block 504, based on the request, receive a first financial data analytics recommendation and a second financial data analytics recommendation. The first financial data analytics recommendation is associated with an opportunity to sell a product and the second financial data analytics recommendation is associated with a customer risk of attrition. At block 506, cause presentation of the first financial data analytics recommendation in combination with a first plurality of insights. At block 508, cause presentation of the second financial data analytics recommendation in combination with a second plurality of insights.

Additional Support for Detailed Description of the Invention

Example Distributed Computing System Environment

Figure 6:
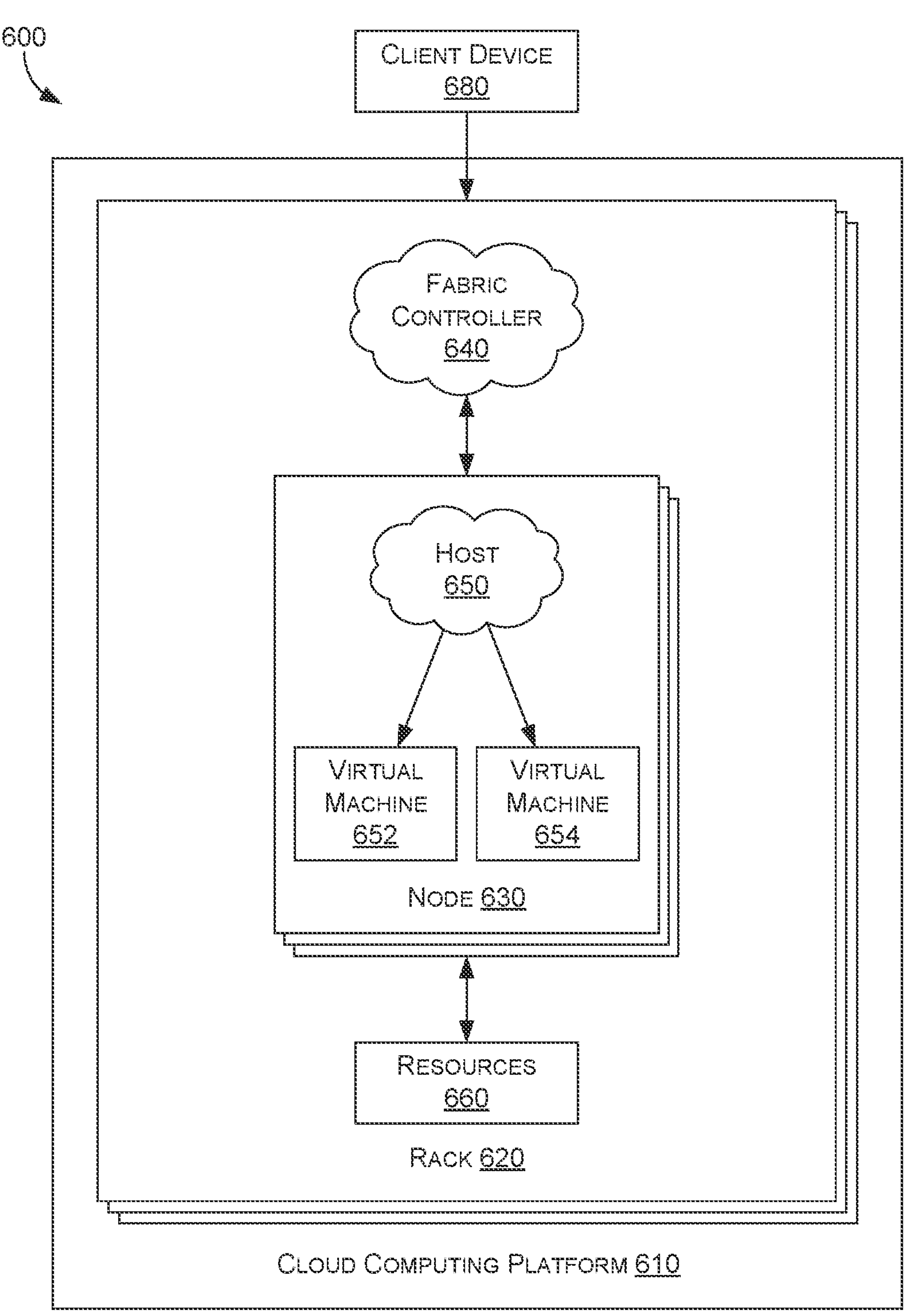
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high-level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Distributed Computing Environment

Figure 7:
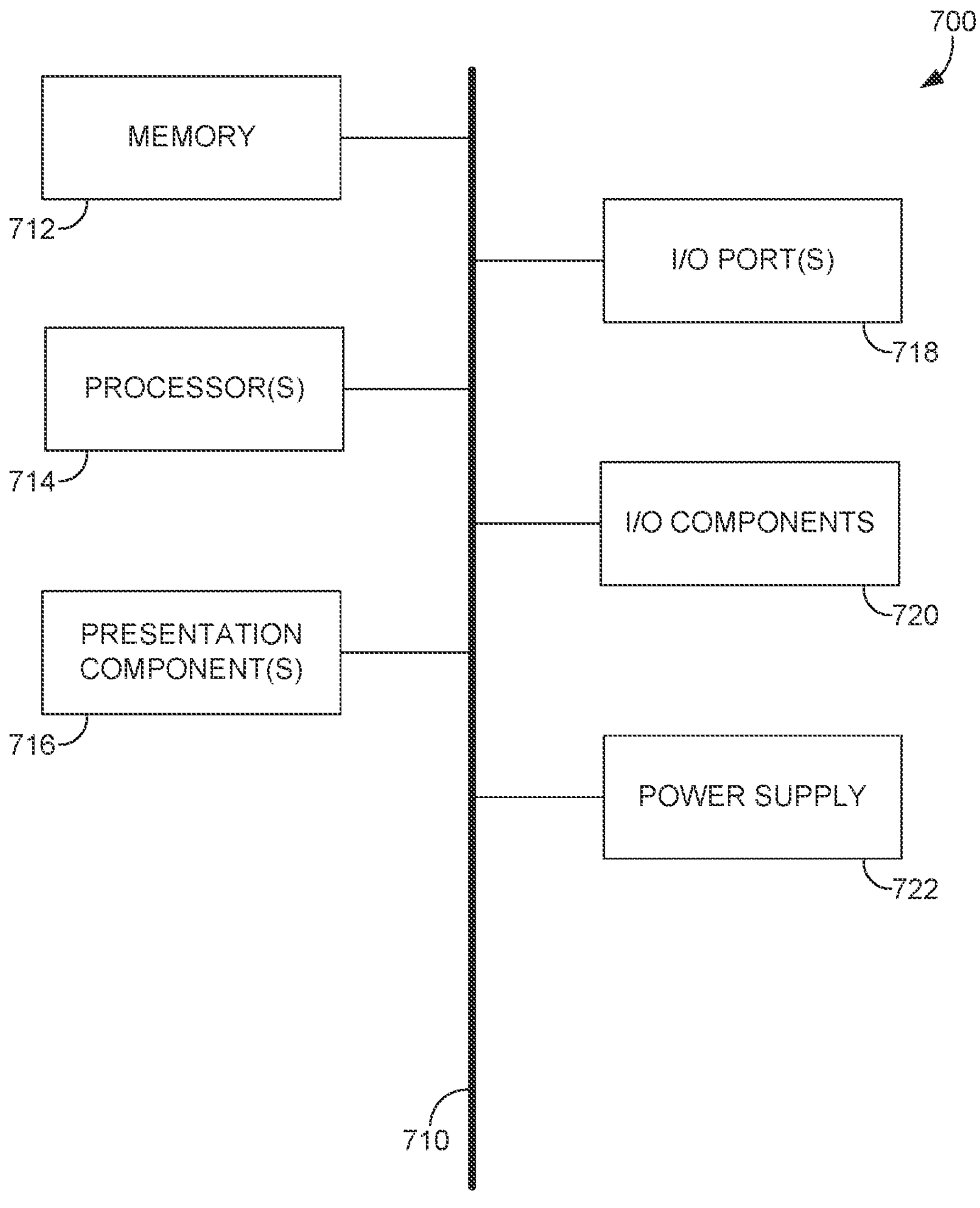
FIG. 7 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:

one or more computer processors; and computer memory storing computer-useable instructions that, when used by the one or more computer processors, cause the one or more computer processors to perform operations comprising:

generating, by the one or more processors, training data based on first input data comprising customer data, transaction data, and product data, wherein generating the training data comprises:

aggregating the first input data to generate a plurality of data chunks, wherein each data chunk represents an aggregate of a respective portion of the first input data over a respective time period and for a respective customer, defining a backward window time period and a forward window time period, generating a plurality of feature variables based on the data chunks, the plurality of feature variables representing features of the first input data corresponding to the backward window time period, and generating a plurality of target variables based on the first input data, the plurality of feature variables representing events occurring during the forward window time period;

training, by the one or more processors using the training data, a predictive machine learning model to perform operations including generating a first financial data analytics recommendation associated with a customer risk of attribution and a second financial data analytics recommendation associated with insights associated with one or more customers or products, wherein training the predictive machine learning model comprises:

aggregating at least some of the feature variables with respect to the backward window time period, and determining one or more patterns between the feature variables and the target variables;

accessing, by the one or more processors, second input data of a customer;

analyzing the second input data using the predictive machine learning model;

rendering, on a display device, a graphical user interface for presentation to the user, wherein rendering the graphical user interface comprises:

determining a set of financial data analytics recommendations including a first financial data analytics recommendation associated with the customer, grouping, in the graphical user interface, visual representations of the set of financial data analytics recommendations according to a quality of each of the financial data analytics recommendations, wherein the quality of each of the financial data analytics recommendations is determined using the predictive machine learning model, filtering, from the graphical user interface, at least some of the visual representation of the financial data analytics recommendations based on one or more filter rules, and causing rendering, in the graphical user interface, of at least some of the grouped and filtered financial data analytics recommendations including the first financial data analytics recommendation, along with one or more visual representations of a plurality of insights that provide human-readable explanations for the first financial data analytics recommendation.

2. The system of claim 1, wherein training the predictive machine learning model comprises aggregating the training data based on selected data aggregation levels and product aggregation levels.

3. The system of claim 1, wherein the predictive machine learning model is trained based on a tree-based approach that identifies customer segments as subgroups having different target rates based on feature variable values of customers.

4. The system of claim 1, wherein the first financial data analytics recommendation is generated based in part on assigning the customer to a subgroup based on feature variable values of the customer and a predicted likelihood that the customer corresponds to a target rate of the subgroup.

5. The system of claim 1, the operations further comprising assigning a financial product lead information insight that explains why the customer is likely to purchase a corresponding product during a specified time period.

6. The system of claim 1, the operations further comprising assigning a financial product lead information insight that explain why the customer is to churn within a specified time period.

7. The system of claim 1, the operations further comprising calculating an expected monetary impact of the first financial data analytics recommendation.

8. The system of claim 1, wherein the first financial data analytics recommendation comprises financial product lead information including a specific product and a specific point in time that is included in an insight from the plurality of insights.

9. The system of claim 1, wherein the graphical user interface comprises financial data analytics interface elements associated with solution interface data.

10. The system of claim 1, wherein the graphical user interface comprises financial data analytics interface elements associated with retention interface data.

11. The system of claim 1, wherein the predictive machine learning model is fitted to the feature variables and the target variables of a plurality of products to identify a best fit model for the plurality of products or an alert for increased risk of attrition of the customer.

12. The system of claim 1, the operations further comprising:

causing generation of the first financial data analytics recommendation and the second financial data analytics recommendation based on:

detecting, using the predictive machine learning model, patterns in input data associated with the feature variables;

based on the detected patterns, generating values for target variables that are based on values of the feature variables;

based on generating the values for the target variables, generating a global set of financial data analytics recommendations having lead information associated with the feature variables and the target variables applying business rules based on a scoring model to filter the global set of financial data analytics recommendations;

applying overlay rules to suppress or change the global set of financial data analytics recommendations; and communicating, for presentation on the graphical user interface, the first financial data analytics recommendation and the second financial data analytics recommendation.

13. A computer-implemented method, the method comprising:

generating, by one or more processors, training data based on first input data comprising customer data, transaction data, and product data, wherein generating the training data comprises:

aggregating the first input data to generate a plurality of data chunks, wherein each data chunk represents an aggregate of a respective portion of the first input data over a respective time period and for a respective customer, defining a backward window time period and a forward window time period, generating a plurality of feature variables based on the data chunks, the plurality of feature variables representing features of the first input data corresponding to the backward window time period, and generating a plurality of target variables based on the first input data, the plurality of feature variables representing events occurring during the forward window time period;

training, by the one or more processors using the training data, a predictive machine learning model to perform operations including generating a first financial data analytics recommendation associated with a customer risk of attribution and a second financial data analytics recommendation associated with insights associated with one or more customers or products, wherein training the predictive machine learning model comprises:

aggregating at least some of the feature variables with respect to the backward window time period, and determining one or more patterns between the feature variables and the target variables;

accessing, by the one or more processors, second input data of a customer;

analyzing the second input data using the predict machine learning model;

rendering, on a display device, a graphical user interface for presentation to the user using a web-service, wherein rendering the graphical user interface comprises:

determining a set of financial data analytics recommendations including a first financial data analytics recommendation associated with the customer, grouping, in the graphical user interface, visual representations of the set of financial data analytics recommendations according to a quality of each of the financial data analytics recommendations, wherein the quality of each of the financial data analytics recommendations is determined using the predictive machine learning model, filtering, from the graphical user interface, at least some of the visual representation of the financial data analytics recommendations based on one or more filter rules, and causing rendering, in the graphical user interface, of at least some of the grouped and filtered financial data analytics recommendations including the first financial data analytics recommendation, along with one or more visual representations of a plurality of insights that provide human-readable explanations for the first financial data analytics recommendation.

14. The method of claim 13, wherein the financial data analytics recommendation comprises financial product lead information including a specific product and a specific point in time that is included in an insight from the plurality of insights.

* * * * *